(12) United States Patent
Crawford et al.

(10) Patent No.: US 6,199,466 B1
(45) Date of Patent: Mar. 13, 2001

(54) APPARATUS AND METHOD FOR PROCESSING PALLETIZED CONTAINERS

(75) Inventors: John R. Crawford, Inver Grove Heights; Michael L. Nelson, Lino Lakes, both of MN (US)

(73) Assignees: Solid Waste Management Systems, Inc., Inver Grove Heights; Nelson Technical Services, Inc., Lino Lakes, both of MN (US)

( * ) Notice: Subject to any disclaimer, the term of this patent is extended or adjusted under 35 U.S.C. 154(b) by 0 days.

(21) Appl. No.: 09/011,587
(22) PCT Filed: Aug. 14, 1996
(86) PCT No.: PCT/US96/13179
  § 371 Date: Apr. 13, 1998
  § 102(e) Date: Apr. 13, 1998
(87) PCT Pub. No.: WO97/06932
  PCT Pub. Date: Feb. 27, 1997

Related U.S. Application Data
(60) Provisional application No. 60/002,339, filed on Aug. 15, 1995.

(51) Int. Cl.$^7$ ................................................ B26D 1/04
(52) U.S. Cl. ................................ 83/54; 83/56; 83/943; 83/946; 83/90; 83/157; 29/426.3; 29/822
(58) Field of Search ................................ 83/54, 176, 56, 83/613, 157, 84, 86, 90, 91, 943, 946; 29/822, 426.3

(56) References Cited

U.S. PATENT DOCUMENTS

| | | |
|---|---|---|
| 2,816,502 | 12/1957 | Eismann . |
| 3,129,656 | 4/1964 | Judd . |
| 3,869,780 | 3/1975 | Ginnow et al. . |
| 3,968,560 | 7/1976 | Vial . |
| 4,112,578 | 9/1978 | Sanford . |
| 4,121,515 | 10/1978 | Tea . |
| 4,241,495 | 12/1980 | Wakeem ................................. 83/925 |
| 4,306,478 | 12/1981 | Stolzer ................................... 83/464 |
| 4,320,570 | 3/1982 | Williams . |
| 4,346,506 | 8/1982 | Martindale .......................... 83/477.1 |
| 4,392,403 | 7/1983 | Martindale, Jr. ........................ 83/418 |
| 4,464,960 | 8/1984 | Roepers et al. ......................... 83/104 |
| 4,586,235 | 5/1986 | Benvenuto ............................. 83/582 |
| 4,601,238 | 7/1986 | Davis, Jr. et al. . |
| 4,633,581 | 1/1987 | Villanueva . |
| 4,649,617 | 3/1987 | Hufnagel . |
| 4,903,902 | 2/1990 | Hufnagel ............................. 83/471.2 |
| 4,949,898 | 8/1990 | Nederveld . |
| 4,969,559 | 11/1990 | Nederveld . |

(List continued on next page.)

FOREIGN PATENT DOCUMENTS

WO 97/06932    2/1997    (WO) .

*Primary Examiner*—M. Rachuba
(74) *Attorney, Agent, or Firm*—Merchant & Gould P.C.

(57) ABSTRACT

An apparatus for processing a palletized container (411), the palletized container (411) including a container (413) affixed to a pallet (415). The apparatus includes a receptacle (412) arranged and configured for receiving the palletized container (411). A shearing mechanism is incorporated within the receptacle (412). The shearing mechanism is constructed and arranged for generating relative movement between the container (413) and the pallet (415) such that the container (413) is sheared from the pallet (415). The shearing mechanism includes support structure (428) for supporting the palletized container (411) within the receptacle (412) by engaging the pallet (415) of the palletized container (411). The shearing mechanism also includes a shearing member (440) having an edge (456) spaced a predetermined distance ($D_1$) from the support structure (428). The predetermined distance ($D_1$) is slightly greater than a thickness ($D_2$) of the pallet (415) such that the edge (456) of the shearing member (440) is adapted to align substantially with the interface between the pallet (415) and the container (413).

20 Claims, 21 Drawing Sheets

U.S. PATENT DOCUMENTS

| | | |
|---|---|---|
| 5,071,010 | 12/1991 | Carufel-Zeman . |
| 5,195,429 | 3/1993 | Firpo . |
| 5,201,110 | 4/1993 | Bane ........................................ 83/943 |
| 5,205,197 | 4/1993 | Wiltshire ................................. 83/364 |
| 5,243,751 | 9/1993 | Dykstra et al. ......................... 83/474 |
| 5,307,554 | 5/1994 | Johnson et al. ......................... 83/477 |
| 5,314,126 | 5/1994 | Alvarez . |
| 5,366,790 | 11/1994 | Liebel . |

APPARATUS AND METHOD FOR PROCESSING PALLETIZED CONTAINERS

CROSS REFERENCE TO RELATED APPLICATIONS

This application claims priority to U.S. Provisional Application No. 60/002,339 filed Aug. 15, 1995.

FIELD OF THE INVENTION

The present invention relates generally to devices for processing palletized containers. More particularly, the present invention relates to devices for shearing containers from pallets.

BACKGROUND OF THE INVENTION

Palletized containers are commonly employed to store and transport a wide variety of products. A palletized container generally consists of a container removably fastened at its bottom face to a pallet. The container can be made from a variety of different materials. However, the most popular type of container is a cardboard box because it is lightweight and inexpensive. Unfortunately, cardboard containers alone tend to be too weak for some applications. To solve this problem, industry has developed the practice of securing the cardboard container to a pallet. The pallet increases the strength and facilitates the handling of the palletized container with a fork lift truck. Thus, such palletized containers are often used for products which are heavy, such as bottles of liquids, and for products which are bulky, such as automobile components.

Palletized containers have several shortcomings. A first problem is that palletized containers are bulky and cumbersome. When the contents are removed, the palletized containers occupy an inordinate amount of space, making them difficult to store or transport. Another problem is that the palletized containers are difficult to re-use or recycle. The different materials of the pallet and the container have different useful lifetimes and recycling characteristics. Wooden pallets can generally be re-used after the container is removed. Cardboard containers, on the other hand, may not be capable of re-use after they have been manipulated in the shipping process. It is ecologically and often economically beneficial to recycle the cardboard boxes, but the cardboard must first be separated from other materials. It is most often useful to compact the used cardboard for storage, shipment, and processing of the containers.

A further problem is that machines in the prior art are not well suited to processing palletized containers. There are several crushers or balers which are suited to either wood pallets or cardboard boxes, but not both. Also, there are crushers or balers which are capable of pulverizing and compacting the entire palletized container, but they are generally large, complex, and expensive. Further, the pallet cannot then be re-used nor can the wood and cardboard be separated for efficient recycling if the entire palletized container is compacted.

For the foregoing reasons, there is a need for a machine to separate the pallets from the containers and compact the container portion of the palletized container.

SUMMARY OF THE INVENTION

The present invention relates generally to an apparatus for processing a palletized container. The apparatus includes a receptacle arranged and configured for receiving the palletized container. A shearing mechanism is incorporated within the receptacle. The shearing mechanism is constructed and arranged for generating relative movement between the container and the pallet such that the container is sheared from the pallet. In a preferred configuration, the shearing mechanism includes support structure for supporting the palletized container within the receptacle by engaging the pallet of the palletized container. The shearing mechanism also includes a shearing member having an edge spaced a predetermined distance from the support structure. The predetermined distance is slightly greater than a thickness of the pallet such that the edge of the shearing member is adapted to align substantially with the interface between the pallet and the container.

In one embodiment of the present invention, the support structure comprises a stationary bed of the receptacle, and the shearing member is moveably mounted within the receptacle.

In another embodiment of the present invention, the support structure comprises a pivot plate pivotally mounted within the receptacle. The pivot plate is pivotally moveable between a first position in which the pivot plate is adapted to support the pallet, and a second position in which the pivot plate is adapted to discharge the pallet from the receptacle.

In a further embodiment of the present invention, the support structure comprises a slide plate moveable mounted within the receptacle. The slide plate is constructed and arranged to move the pallet with respect to the shearing member such that the container is sheared from the pallet.

Another aspect of the present invention relates to a method for processing a palletized container. The method includes the step of placing the palletized container in a receptacle having a pallet discharge opening, a container discharge opening, and a shearing mechanism including a shearing member. Once the palletized container is within the receptacle, an edge of the shearing member is aligned with an interface between the pallet and the container of the palletized container. Next, relative movement is generated between the pallet and the container such that the shearing member engages the container and shears the container from the pallet. The sheared container is then discharged through the container discharge opening while the pallet is discharged through pallet discharge opening.

A variety of advantages of the invention will be set forth in part in the description which follows, and in part will be obvious from the description, or may be learned by practice of the invention. The advantages of the invention will be realized and attained by means of the elements and combinations particularly pointed out in the claims. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. A brief description of the drawings is as follows.

DETAILED DESCRIPTION OF THE PREFERRED EMBODIMENT

Reference will now be made in detail to exemplary embodiments of the present invention which are illustrated in the accompanying drawings. Wherever possible, the same reference numbers will be used throughout the drawings to refer to the same or like parts.

The present invention relates to a machine for processing palletized containers. Preferably, the machine is constructed and arranged to shear a container from a pallet such that the pallet and the container can be individually processed.

Figure 1A:
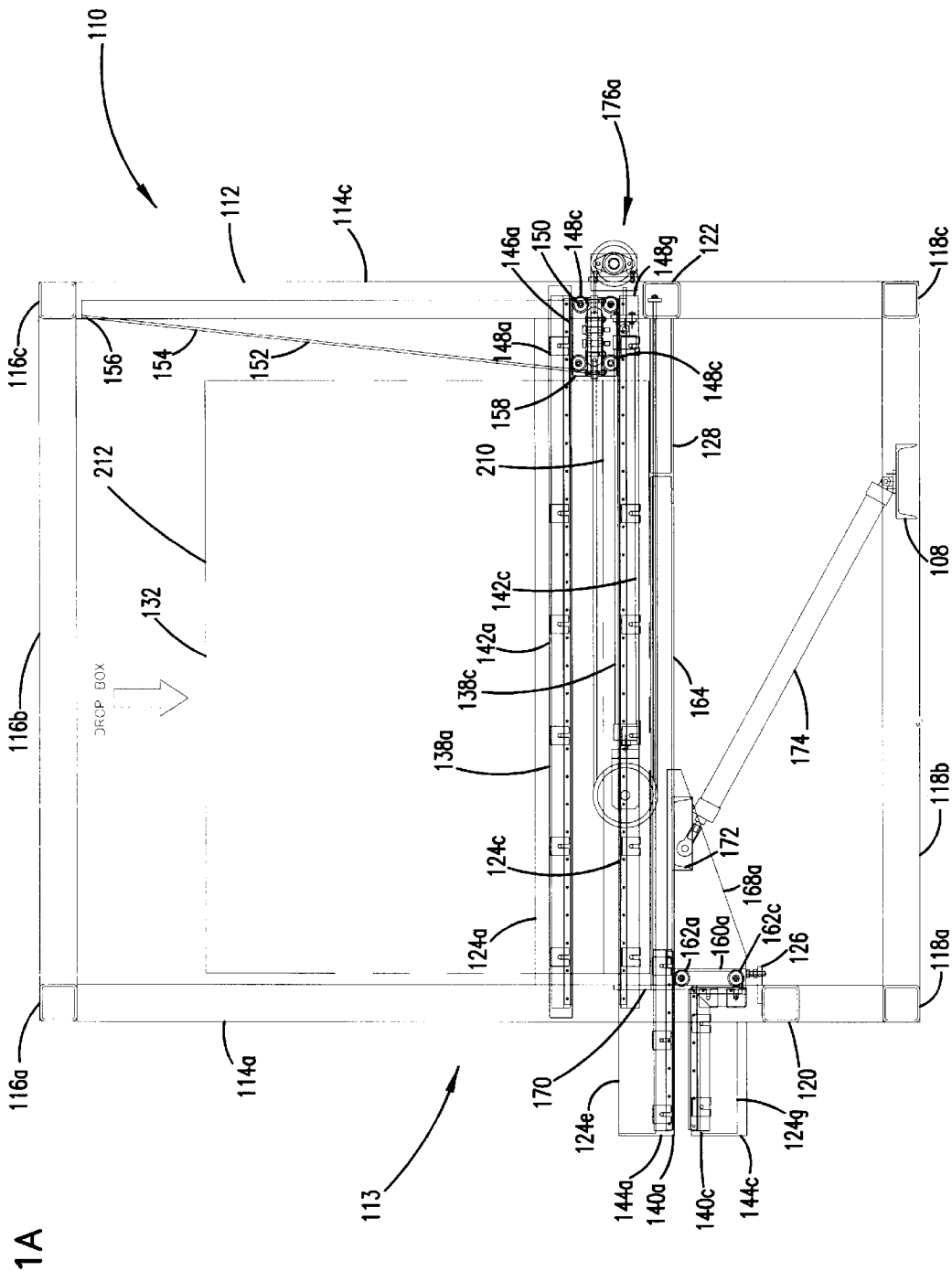
FIGS. 1A–1E show constructed in accordance with the principles of the present invention, the apparatus is shown during successive stages of operation.
Figure 4:
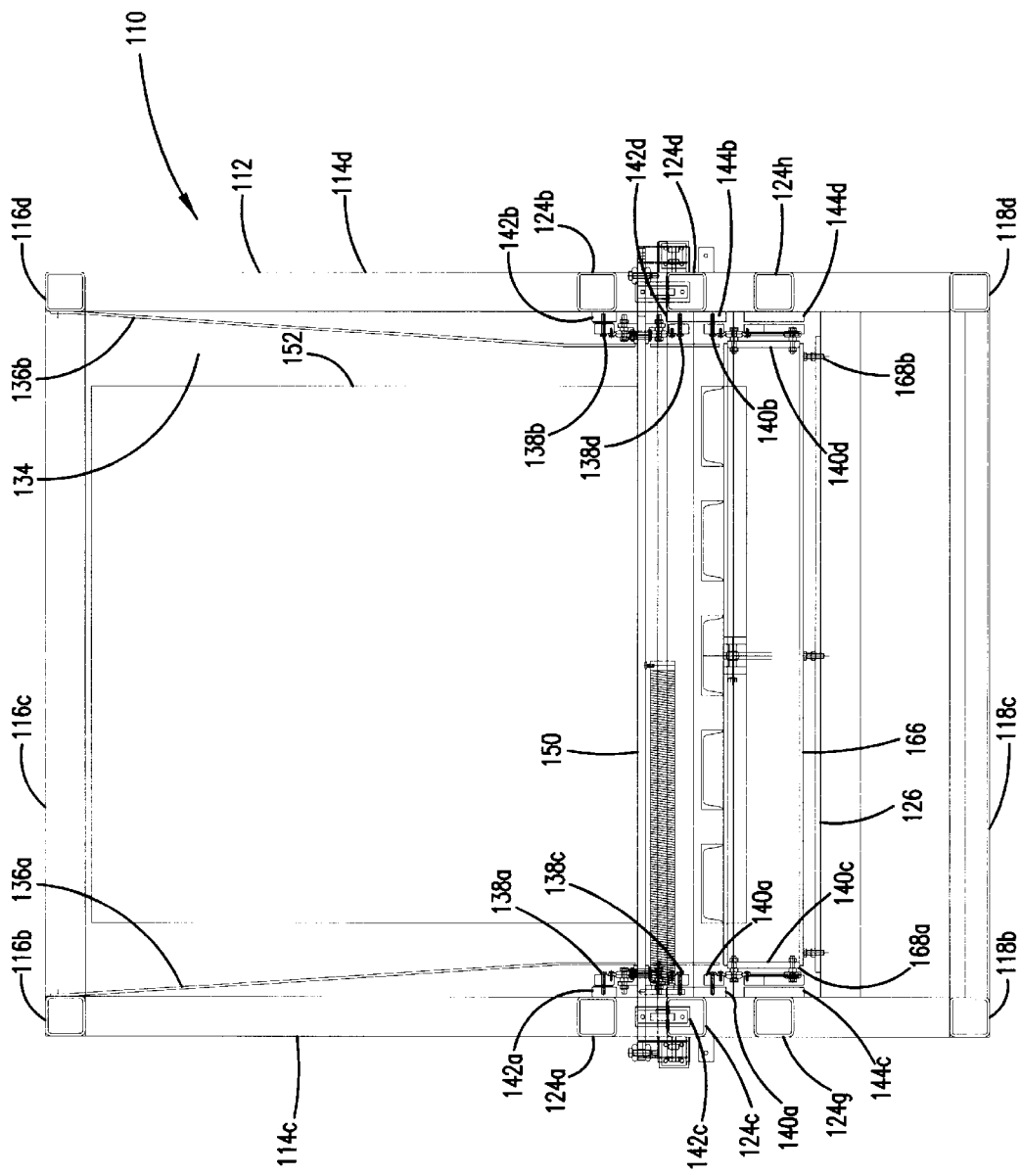
FIG. 4 is a rear plan view of the apparatus of FIGS. 1A–1E.
Figure 5:
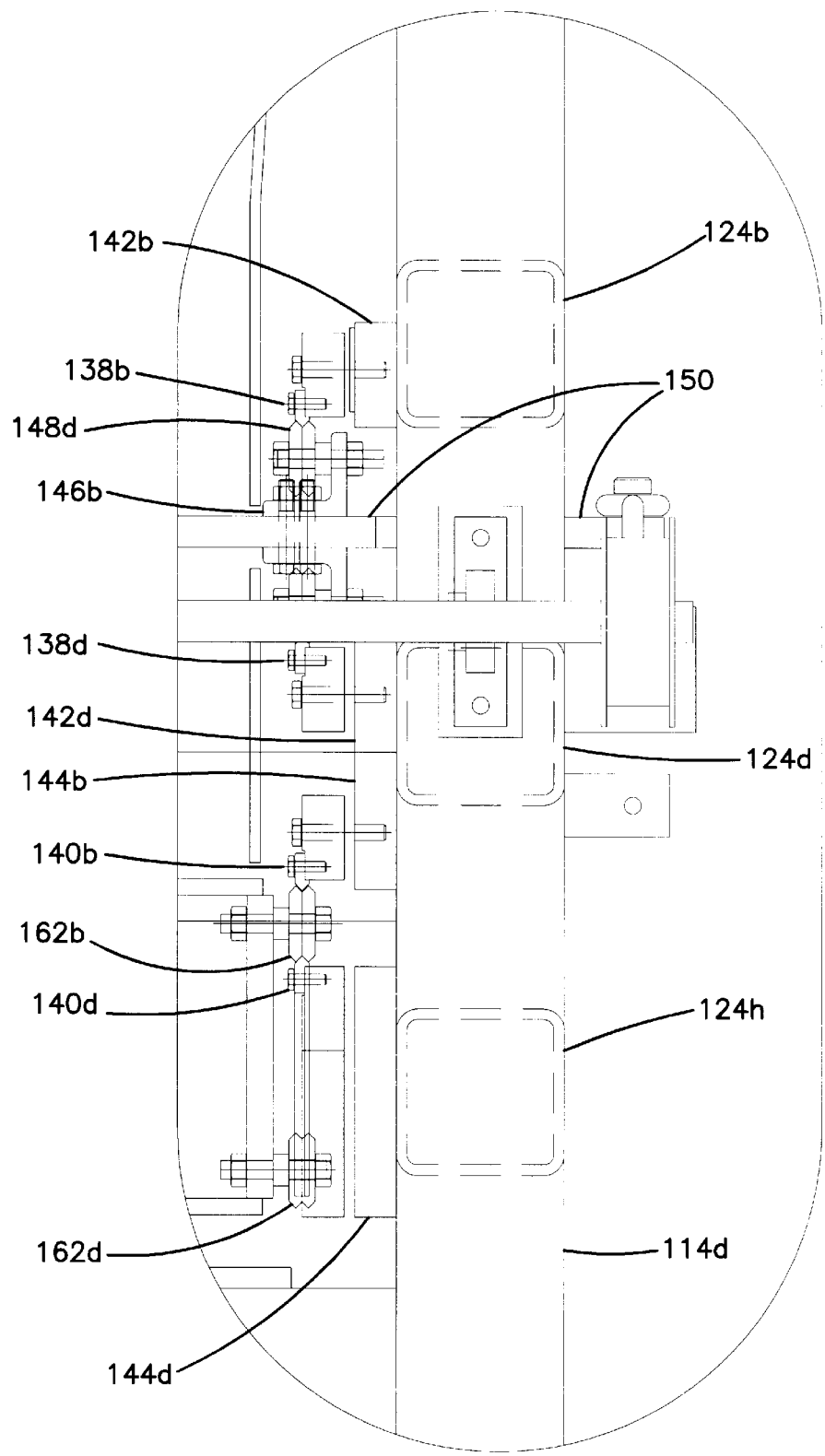
FIG. 5 is an enlarged section of the view of FIG. 4, showing the position of the tracks and rollers within the frame.

The first embodiment of the invention, as shown by FIGS. 1a, 4, and 5, comprises a machine 110 supported by a frame 112. A front side 113 of the machine is defined as the side on which the container is expelled. The frame 112 comprises a pair of substantially vertical front frame members 114a and 114b joined to a pair of substantially vertical rear frame members 114c and 114d, all of which are substantially similar in length. The front vertical frame members 114a and 114b and rear vertical frame members 114c and 114d are squarely joined at one end by top frame members 116a–116d, and at the other end by base frame members 118a–118d. Said frame members thus form a square box shape. The frame members as shown are formed of square cross-sectional tubing. The frame 112 can be sized such that standard square pallet sizes, such as those of up to 60" by 60", can be accommodated.

A plurality of supplemental frame members 120, 122, 124a–124h are substantially horizontal and joined to vertical frame members 114a–114d for the mounting of machine components. A frame member 120 connects front vertical frame members 114a and 114b. A pivot stop 126 is fastenably mounted to the frame member 120. A frame member 122 connects rear vertical frame members 114c and 114d. A stationary horizontal platform 128 is mounted to the supplemental frame member 122.

A plurality of supplemental frame members 124a–124h run in the direction of front to back and are reflected on two sides of the frame. Upper frame members 124a and 124b and middle frame members 124c and 124d connect front vertical frame members 114a and 114b to rear vertical frame members 114c and 114d. Middle frame members 124e and 124f and lower frame members 124g and 124h connect to front frame members 114a and 114b and extend forward from the frame 112.

Figure 3:
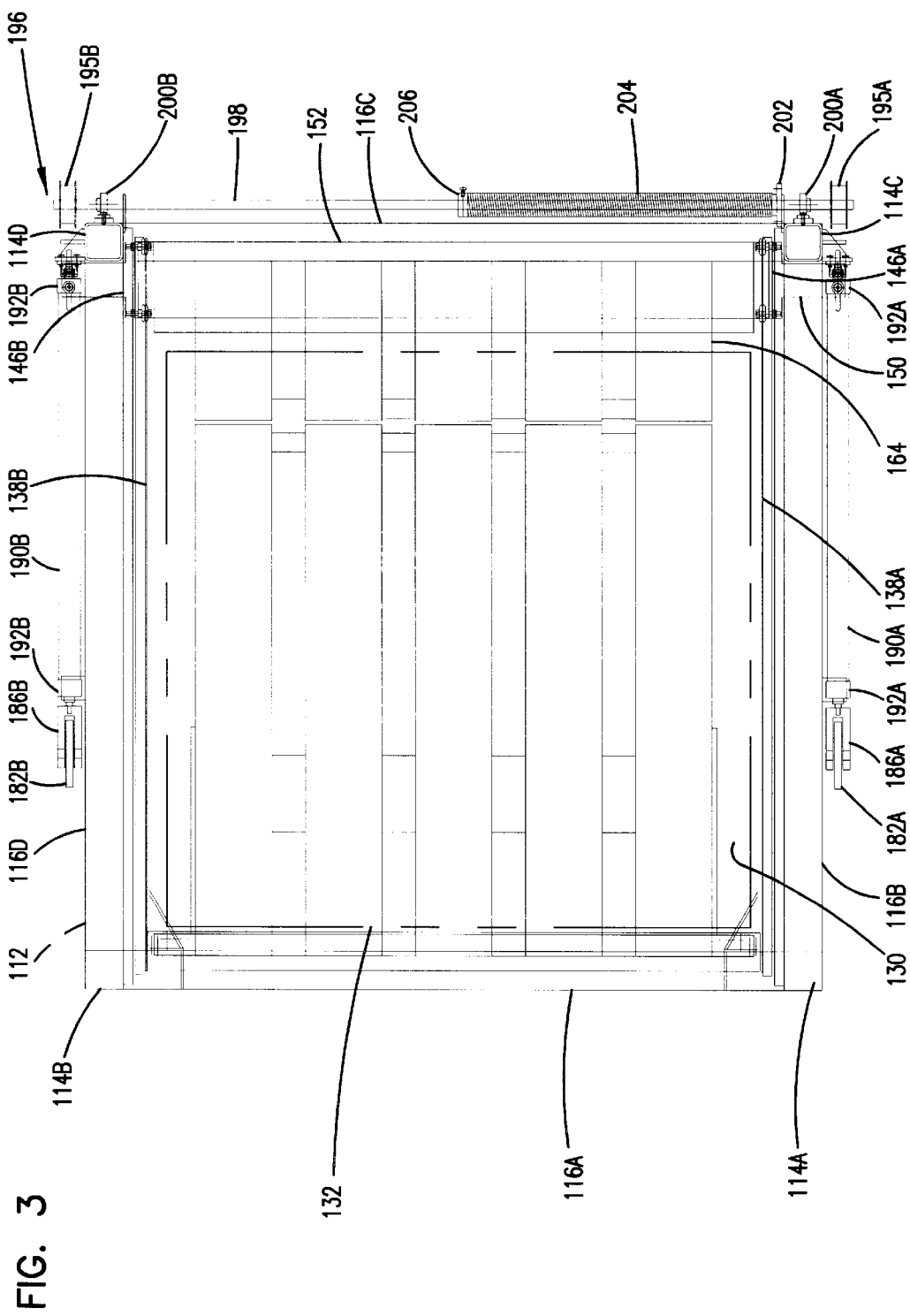
FIG. 3 is a top plan view of the apparatus of FIGS. 1A–1E.

As shown in FIG. 3, a top opening 130 is the area between top frame members 116a–116d and remains unobstructed for insertion of the palletized container 132. As shown in FIG. 4, a front opening 134 is the area between the top front frame member 116a, the front vertical frame members 114a and 114b, and the front supplemental frame member 120. The front opening 134 remains unobstructed for expelling the palletized container 132.

As shown in FIG. 4, a pair of guide walls 136a and 136b are fastened to the top frame members 116b and 116d which connect the front and rear of the frame. The guide walls 136a and 136b slope inward in order to centrally position the palletized container 132 as it is dropped into the machine 110 and to protect various machine components located inside the frame 112.

As shown by FIGS. 1A, 4 and 5, a plurality of mounting bases 142a–142d and 144a–144d are fixedly mounted to the frame 12 on the interior side. A plurality of tracks 138a–138d and 140a–140d are removably affixed to the frame 112 by means of fasteners.

Shear platen tracks 138a–138d extend from along the front vertical frame members 114a and 114b to the rear vertical frame members 114c and 114d. The upper pivot platen tracks 140a and 140b extend from the front end of the middle external frame members 124e and 124f to a short distance behind the front vertical frame members 114a and 114b. The lower pivot platen tracks are mounted to the lower external frame members 124g and 124h and extend from the front end of the frame members to the inside surface of the attached vertical frame members 114a and 114b, then turn squarely downward.

As shown by FIGS. 1A and 4, a pair of shear platen carriages 146a and 146b comprise a plurality of rollers 148a–148h which engage the shear platen tracks 138a–138d. The carriages 146a and 146b are mounted to a shear platen base plate 50, which is affixed to the base side of a shear platen 152. The shear platen 152 is rectangular in shape when viewed from the front or rear sides, and is sized such that the sweeping area is similar to standard container sizes. The front face 154 of the shear platen 152 is inclined rearward towards the top edge 156. Thus, the leading edge 158 of the shear platen 152 is at the bottom of the platen and tears apart the palletized container as the shear platen 152 advances.

A pair of pivot platen carriages 160a and 160b comprise a plurality of rollers 162a–162d which engage the pivot platen tracks 140a–140d. The top ends of the pivot platen carriages 160a and 160b are joined to a pivot platen 164. Several brackets 166, 168a and 168b support the connection between the carriages 160a and 160b and the pivot platen 164. A cross bracket 166 joins the pivot platen carriages 160a and 160b and rests against the pivot stop 126 when the pivot platen 164 is in the horizontal position. When the pivot platen 164 rests horizontally, the top surface is flush with the stationary horizontal platform 128 and the length from front to rear extends from the inside of the frame 112 to the horizontal platform 128. Attached to the front end of the pivot platen 164 is a lip 170 to restrain the pallet during shearing. The pivot platen is comprised of a plurality of C-bars (shown in FIG. 4) which are cross-braced by an anchor beam 172 connected to a hydraulic cylinder 174.

Figure 2:
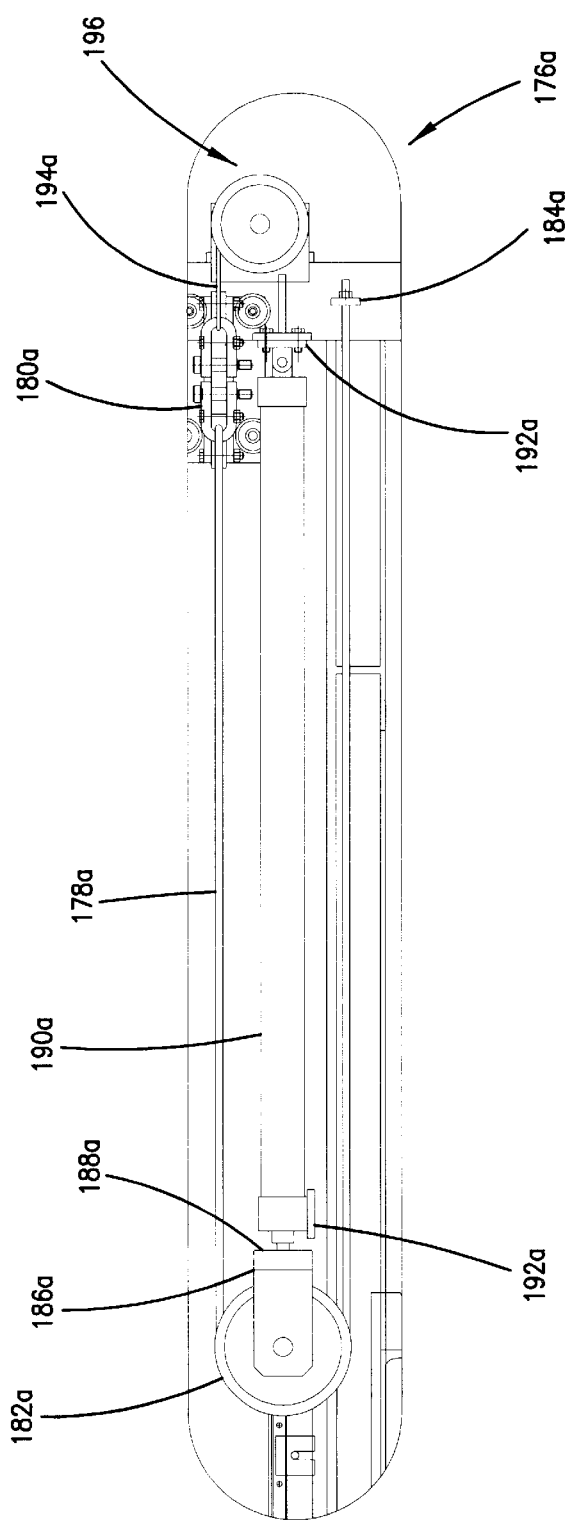
FIG. 2 is an enlarged section of the view of a shear platen drive means employed by the apparatus of FIGS. 1A–1E.

As shown in FIG. 2, a pair of forcing mechanisms 176a and 176b are provided for the shear platen 152. The shear platen 152 is forced in the forward direction by a pair of cables 178a and 178b, fixed to the external ends of the base plate 150 by cable attachments 180a and 180b. The cables 178a and 178b run over a pair of pulleys 182a and 182b and are fixed to the frame at one end by cable anchors 184a and 184b. The pulleys 182a and 182b are rotatably mounted to a pair of clevises 186a and 186b, which are affixed to pistons 188a and 188b driven by a pair of hydraulic cylinders 190a and 190b. The hydraulic cylinders 190a and 190b are fixed to the frame by means of a pair of frame connectors 192a and 192b. The shear platen 152 is forced in the rear direction by a pair of return cables 194a and 194b, fixed to the base plate 150 by cable attachments 180c and 180d. The return cables 194a and 194b are driven by a return spring mechanism 196.

The return spring mechanism 196 is shown by FIG. 3. The return spring cables 194a and 194b wind around return spring pulleys 195a and 195b which are fixedly mounted to a shaft 198. Shaft 198 is rotatably fixed by bearing housings 200a and 200b which are mounted to rear vertical frame members 114c and 114d. A mounting plate 202 is fixed to the frame 112 on one side of a return spring 204, and the other side of the spring is affixed to the spring shaft 198 by a collar 206.

The forcing mechanism for the pivot platen 164, as shown by FIG. 1A, comprises the hydraulic cylinder 174 rotatably fixed to the pivot platen anchor beam 172 and a base anchor beam 208.

In operation of the first embodiment of the invention, as shown by FIGS. 1A through 1E, usage of the apparatus begins with placement of a pallet 210 and an affixed container 212 inside the machine 110. The pallet 210 and container 212 are first dropped into the machine 110 through the top opening 130 and come to rest upon the pivot platen 164 and the stationary horizontal platform 128. The pivot platen 164 is initially positioned horizontally and above the bottom of the frame 112.

Figure 1B:
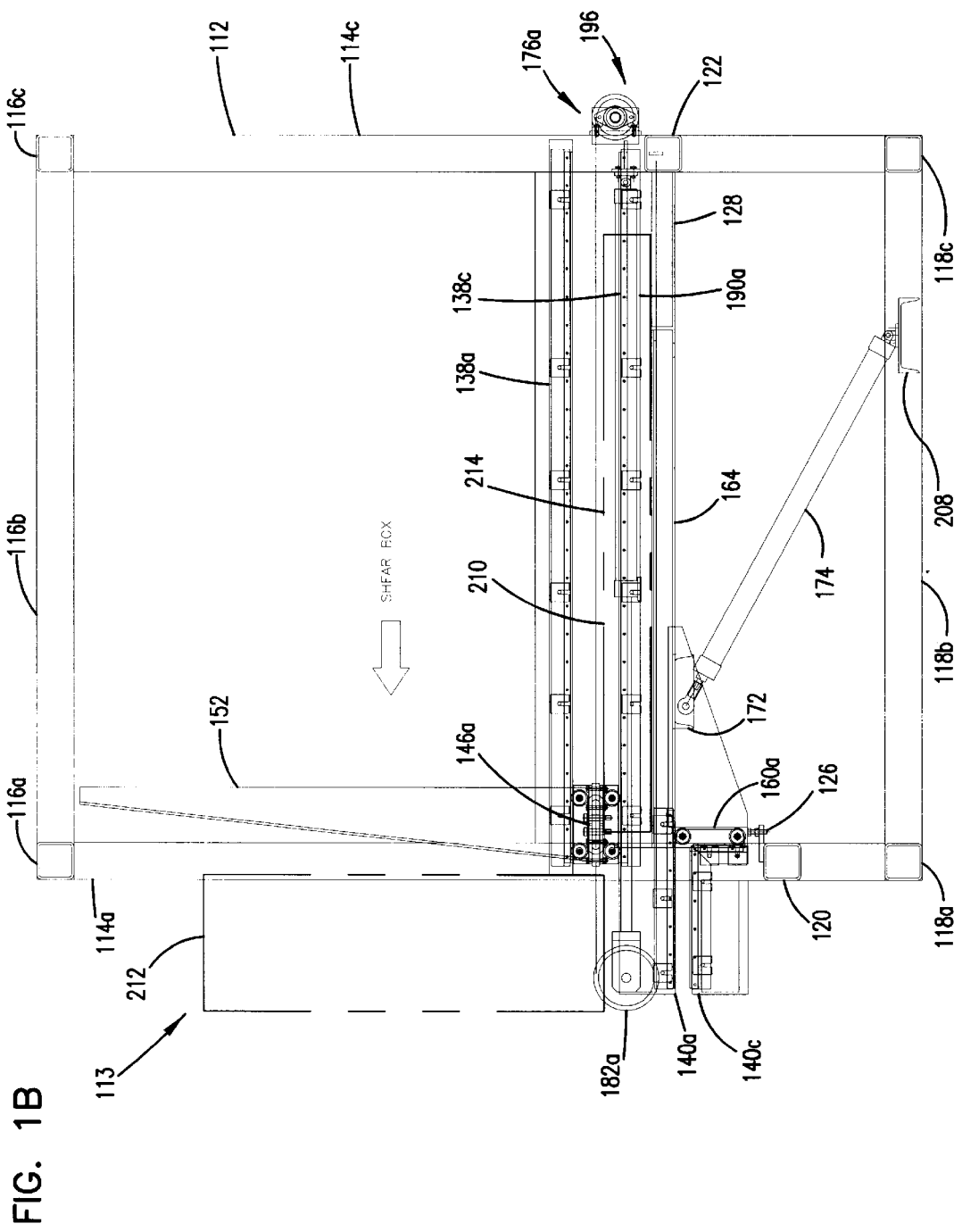

In the second step, as shown by FIG. 1B, the shear platen 152 is forced horizontally over the pallet 210 just above the level of the pallet-container interface 214 toward the front opening 130. Thus, the container 212 is sheared from the pallet 210 and deposited outside the front opening 130. Also, the container 212 is progressively compressed as it is removed from the pallet 210. Movement of the shear platen 152 is forced by the hydraulic cylinders 190a and 190b.

Figure 1C:
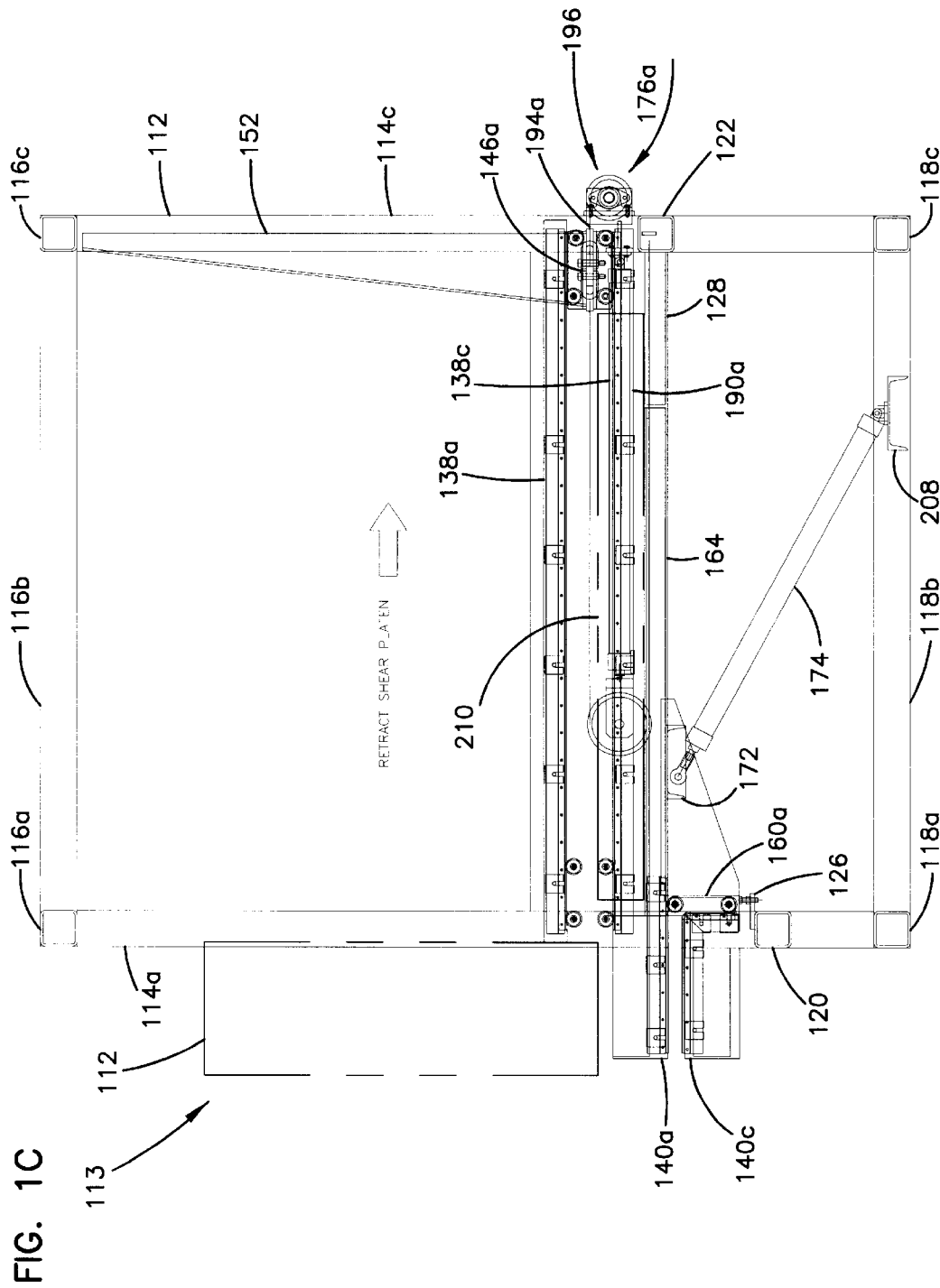

In the third step, as shown by FIG. 1C, the shear platen 152 is retracted to its initial position. The shear platen 152 is forced rearward by the return spring mechanism 196. The return cables 194a and 194b are driven by the return spring 204, which has been wound up during the forward movement of the shear platen 152.

Figure 1D:
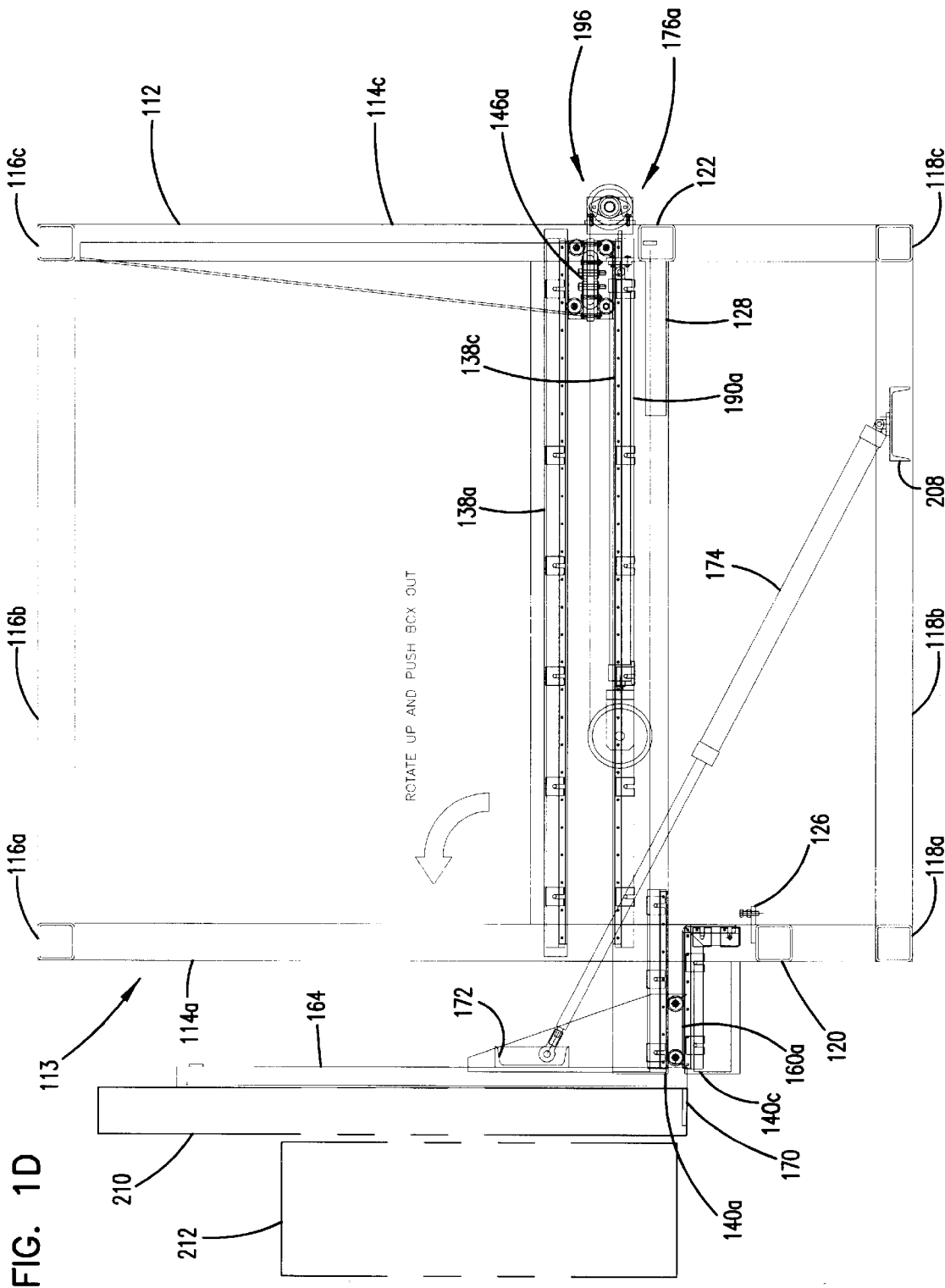

In the fourth step, as shown by FIG. 1D, the pivot platen 164 is tilted to a vertical position and moved horizontally through the front opening 134, thus placing the pallet 210 against the compressed container 212, at the front of the machine. Movement of the platen is forced by extension of the hydraulic cylinder 174.

Figure 1E:
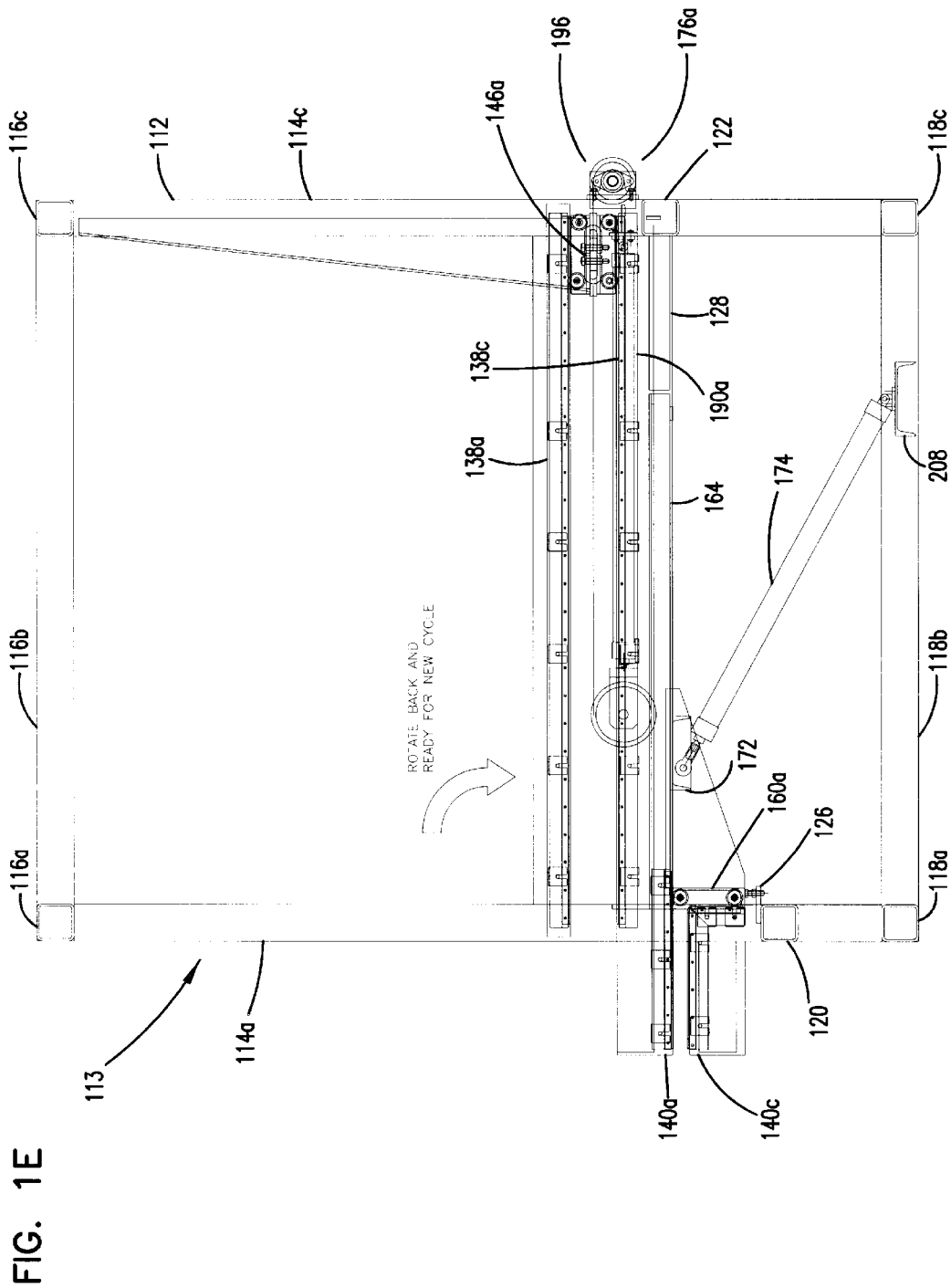

In the fifth step, as show by FIG. 1E, the pivot platen 164 is retracted to its initial position for another cycle. The retraction of the pivot platen is forced by contraction of the hydraulic cylinder 174.

Figure 6A:
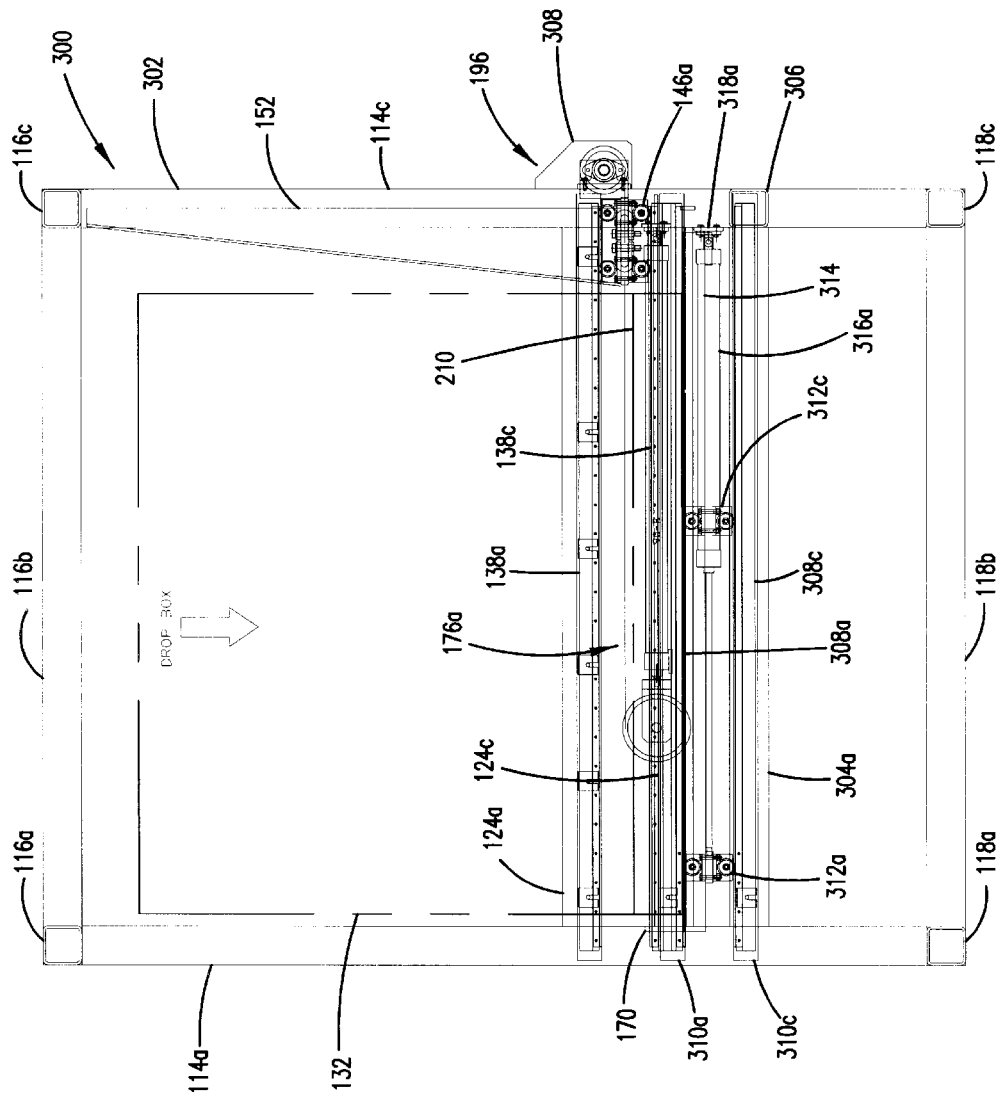
FIGS. 6A–6C illustrates a second apparatus which embodies the invention, the apparatus is shown during successive stages of operation.
Figure 6B:
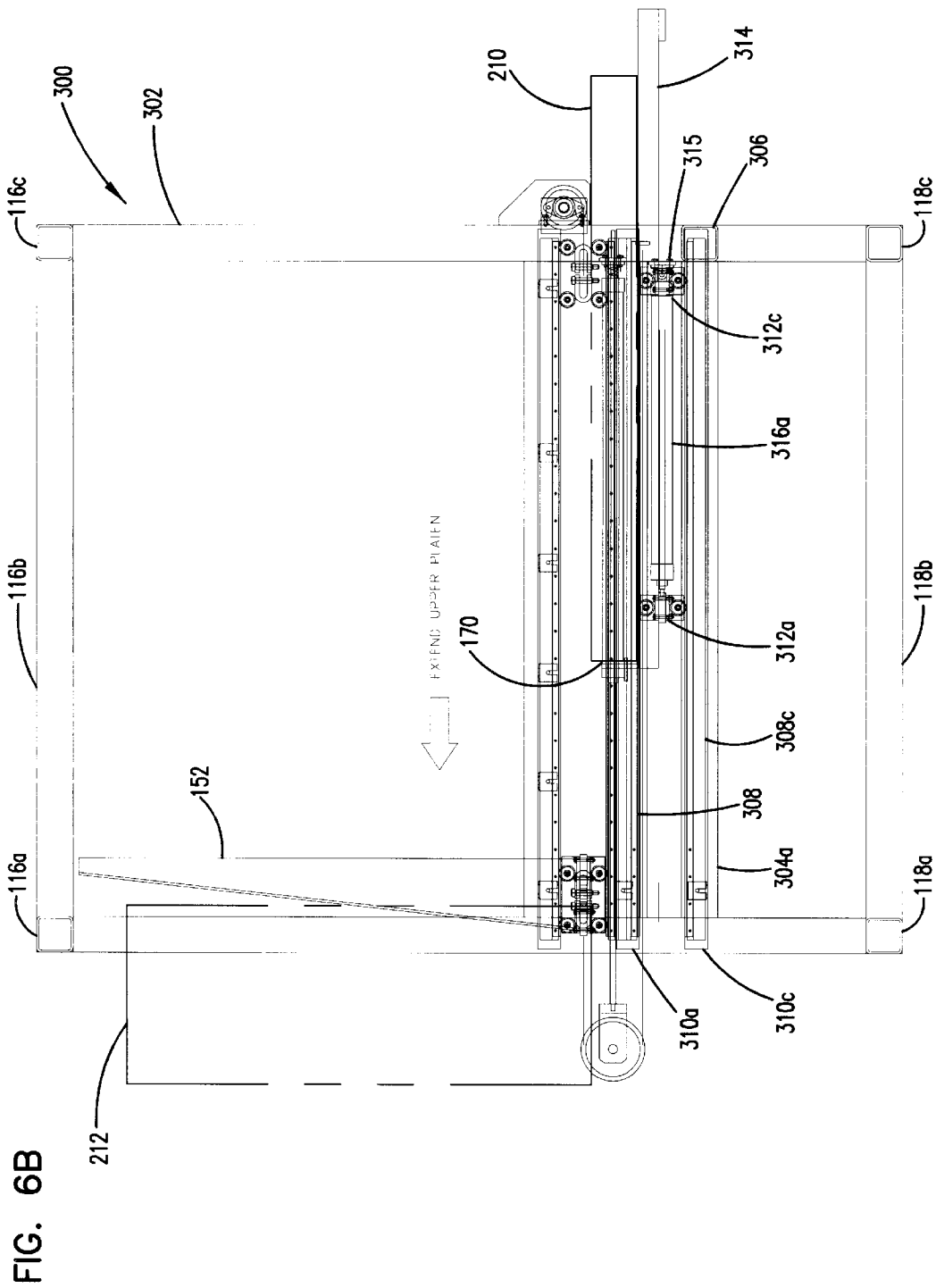
Figure 6C:
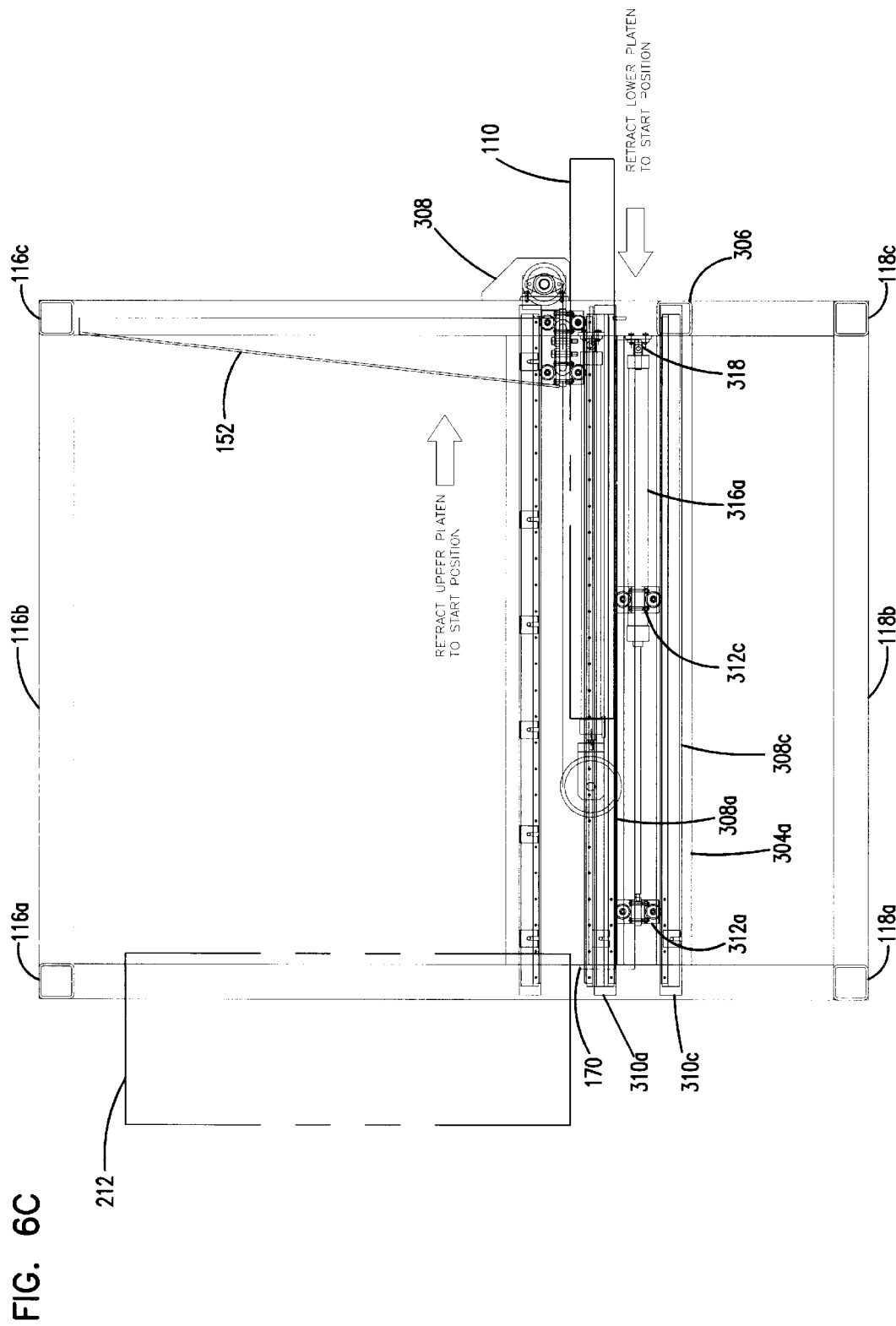

The second embodiment of the invention, as shown in FIGS. 6A–6C, comprises a number of substantially identical parts as the first embodiment. Those parts which are identical to the first embodiment are numbered correspondingly. Parts which include any material difference with the first embodiment are subsequently numbered.

In the second embodiment, the machine 300 comprises a frame 302 which includes identical vertical frame members 114a–114d, top frame members 116a–116d, and base frame members 118a–118d. A plurality of supplemental frame members 124a–124d, 304a and 304b connect front vertical frame members 114a and 114b and rear vertical frame member 114c and 114d and run substantially horizontally. Frame member 306 is substantially horizontal and fixed between rear vertical frame members 114c and 114d at the level of the lower pair of frame members 304a and 304b.

A shear platen 152 and the means for moving it are identical to the first embodiment. The shear platen 152 is mounted upon carriages 146a and 146b which move within shear platen tracks 138a–138d, mounted to frame members 124a–124d. Also similar to the first embodiment, the shear platen 152 is powered by forcing means 176a and 176b and returned by a return spring mechanism 196. In the second embodiment, the return spring mechanism is protected by a cover 308.

Unique to the second embodiment, a pair of upper slide platen tracks 308a and 308b and lower slide platen tracks 308c and 308d are mounted, through mounting bases 310a–310d, to middle supplemental frame members 124c and 124d and to lower supplemental frame members 304a and 304b, respectively. Two pairs of slide platen carriages 312a–312d move by means of rollers 314a–314h within the slide platen tracks 308a–308d. The carriages are fixed to a slide platen 314. The slide platen 314 is substantially flat and horizontal and sized to fit within the frame 302 and hold a pallet 210. A lip 170 along the front edge of the slide platen restrains the pallet 210 during shearing.

A pair of hydraulic cylinders 316a and 316b are fixed to the front pair of slide platen carriages 312a and 312b and also to the frame 302 by a pair of anchoring means 318a and 318b.

In operation of the second embodiment of the invention, as shown in FIGS. 6A–6C, a palletized container 132 is first dropped into the machine 300 and rests upon the slide platen 314.

In the second stage, as shown in FIG. 6B, the shear platen 152 is forced forward over the pallet 210, similar to the first embodiment. However, the slide platen 314 is also forced rearward by compression of the hydraulic cylinders 316a and 316b. At the completion of the second stage of operation, the container 212 is crushed and rests at the forward end of the machine 300, while the pallet 210 is partially ejected at the rear end of the machine 300. The container 212 and pallet 210 can thus be separately removed and processed from opposite ends of the machine 300.

In the third stage, as shown in FIG. 6C, the shear platen 152 and the slide platen 314 return to their original position for reloading of the machine 300. The slide platen is returned by extension of the hydraulic cylinders 316a and 316b.

It will be apparent to one skilled in the art that many other embodiments of the present invention are possible. For example, the movement of the platens may be somewhat different. Also, a means for stacking or transporting away boxes and pallets may be attached to the machine. Such a means might include a gondola or conveyor. Further, many other orientations of the machine and means for moving and forcing the platens are possible, as well as means for controlling movement and operation of the machine.

FIGS. 7–12 illustrate a preferred palletized container processing apparatus 410 constructed in accordance with the principles of the present invention. The apparatus 410 is configured for processing a palletized container 411 that includes a container 413 affixed to a pallet 415. Generally, the apparatus 410 includes a receptacle 412 having a top opening 414 for receiving the palletized container 411 into the receptacle 412. The receptacle 412 also includes a front opening 416 for allowing the container 413 to be discharged from the receptacle 412 and back opening 418 for allowing the pallet 415 to be discharged from the receptacle 412. Incorporated within the receptacle 412 is a shearing mechanism constructed and arranged for generating relative movement between the container 413 and the pallet 415 such that the container 413 is sheared from the pallet 415 and discharged through the front opening 416 of the receptacle 412. A more detailed description of the apparatus 410 and a method of operation of the apparatus 410 is disclosed in the following paragraphs.

Figure 7:
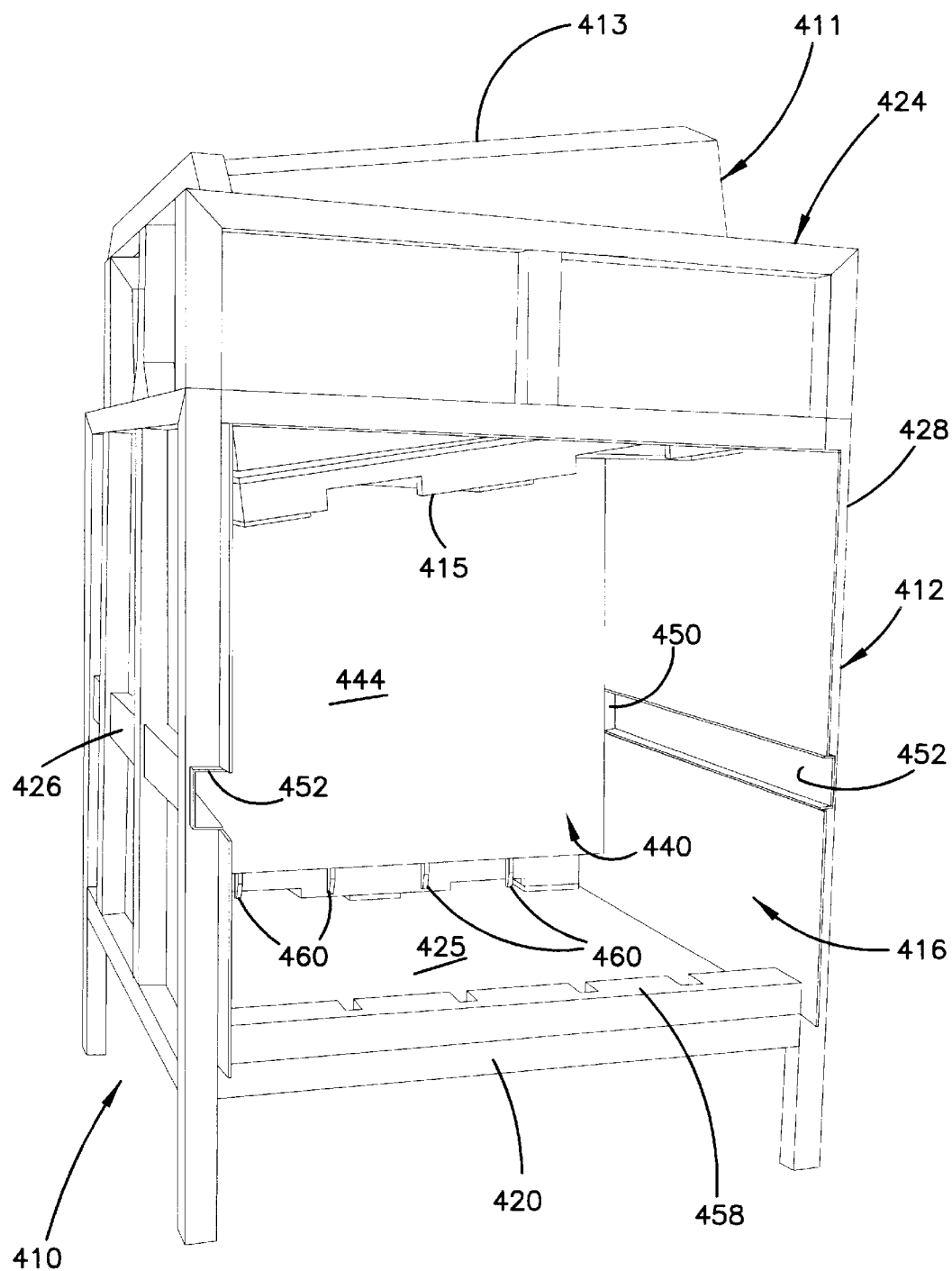
FIG. 7 is a front perspective view of a third palletized container processing apparatus constructed in accordance with the principles of the present invention, a palletized container is shown falling through a top opening of the processing apparatus.
Figure 8:
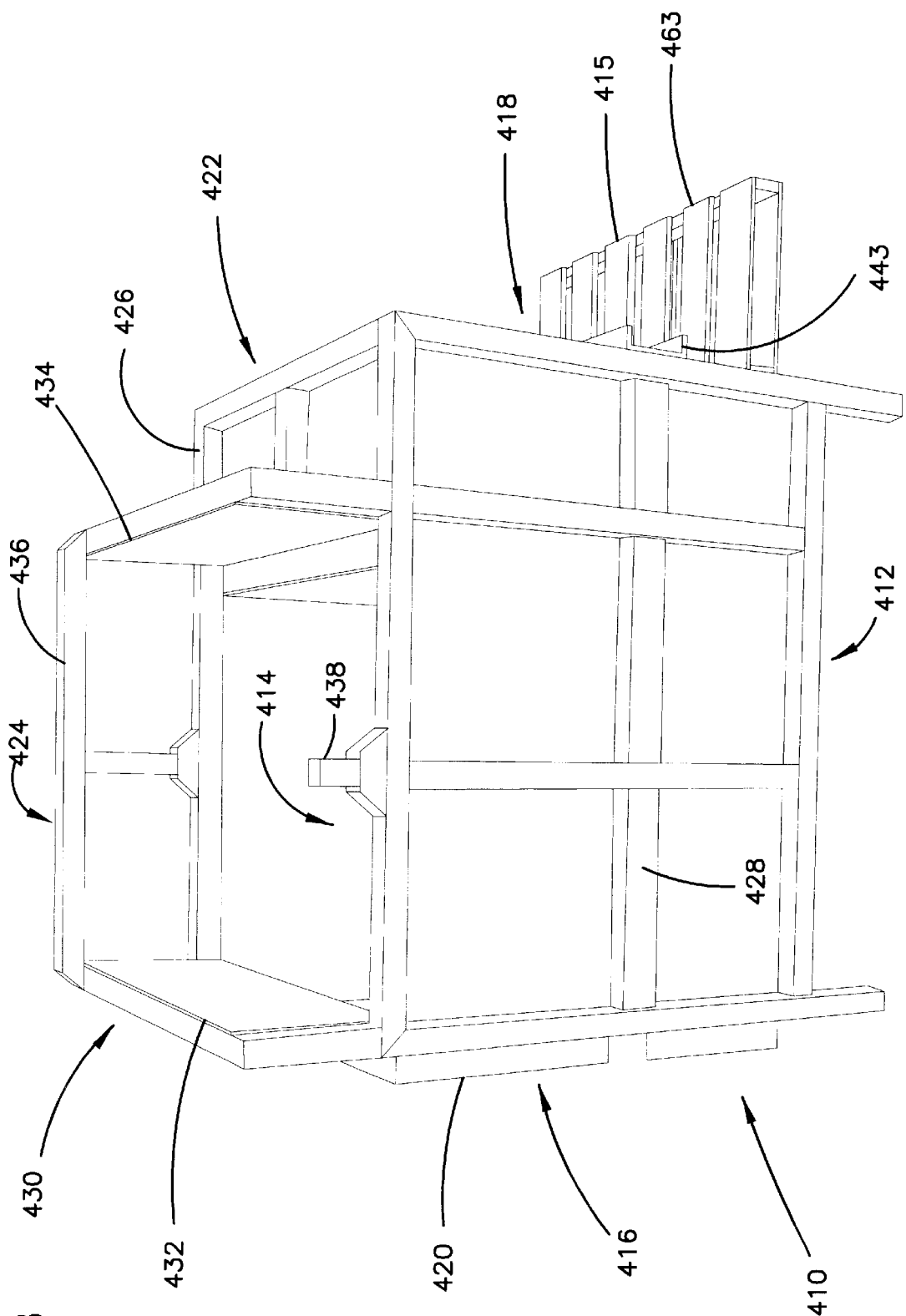
FIG. 8 is a side perspective view of the palletized container processing apparatus of FIG. 7, a pallet is shown being discharged through a back opening of the processing apparatus.

As best shown in FIGS. 7 and 8, the receptacle 412 of the palletized container processing apparatus 410 preferably has a generally rectangular configuration including a front side 420 opposite a back side 422 and a top side 424 opposite a bottom side 425. Opposing first and second sides 426 and 428 extend between the front and back sides 422 and 424 of the receptacle 412. As shown in FIG. 7, the first and second sides 426 and 428 respectively comprise the left and right sides of the receptacle 412.

As best shown in FIG. 8, the top side 424 of the receptacle 412 defines the top opening 414 of the receptacle 412. A chute structure 430 is positioned around the top opening 414 for guiding the palletized container 411 through the top opening 414 into the receptacle 412. The chute structure 430 includes opposing guide plates 432 and 434 extending upward from the receptacle 412 on opposite sides of the top opening 414. A T-shaped retaining member 436 is positioned between the guide plates 432 and 434 and is aligned generally along the top of the first side 426 of the receptacle 412. A rectangular retaining member 438 is positioned opposite from the T-shaped retaining member 436 and projects upward from the middle of the second side 428 of the receptacle 412.

The chute structure 430 functions to guide the palletized container 411 into the receptacle 412. Typically, the palletized container 411 is lifted to the top side 424 of the receptacle 412 by a conventional fork lift (not shown). The palletized container 411 is lifted by the fork lift over the rectangular retaining member 438 and lowered into the top opening 414 of the receptacle 412. As the palletized container 411 is lowered into the top opening 414, the rectangular retaining member 438 slides vertically between the tines of the fork lift. Once the rectangular retaining member 438 is positioned between the tines of the fork lift, the fork lift is backed away from the second side 428 of the receptacle 412 causing the palletized container 411 to engage the rectangular retaining member 438 thereby causing the palletized container to be pulled from the tines of the fork lift. When the tines have been removed from beneath the palletized container 411, the palletized 411 container drops via gravity into the receptacle 412 (as shown in FIG. 7).

The front side 420 of the receptacle 412 (best shown in FIG. 7) defines the front opening 416 of the receptacle 412 while the back side 422 of the receptacle 412 (best shown in FIG. 9) defines the back opening 418 of the receptacle 412. The first side 426, bottom side 425 and second side 428 of the receptacle 412 extend between the front and back sides 420 and 422 of the receptacle and are arranged to define a generally rectangular inner chamber or passageway that extends through the entire receptacle 412. It will be appreciated that the first side 426, second side 428, and bottom side 425 preferably comprise steel plates reinforced by suitable steel bars that are interconnected to provide a rigid framework for the receptacle 412. The bottom side 425 of the receptacle 412 is fixedly connected between the first and second sides 426 and 428 and functions as a stationary bed for supporting palletized containers within the receptacle 412.

The shearing mechanism of the palletized container processing apparatus 410 preferably includes a shearing member 440 movably mounted within the receptacle 412. A drive mechanism reciprocally drives the shearing member 440 between a first position generally adjacent to the back side 422 of the receptacle 412 (as shown in FIGS. 10A and 10B) and a second position generally adjacent to the front side 420 of the receptacle 412 (as shown in FIGS. 11A and 11B).

Figure 9:
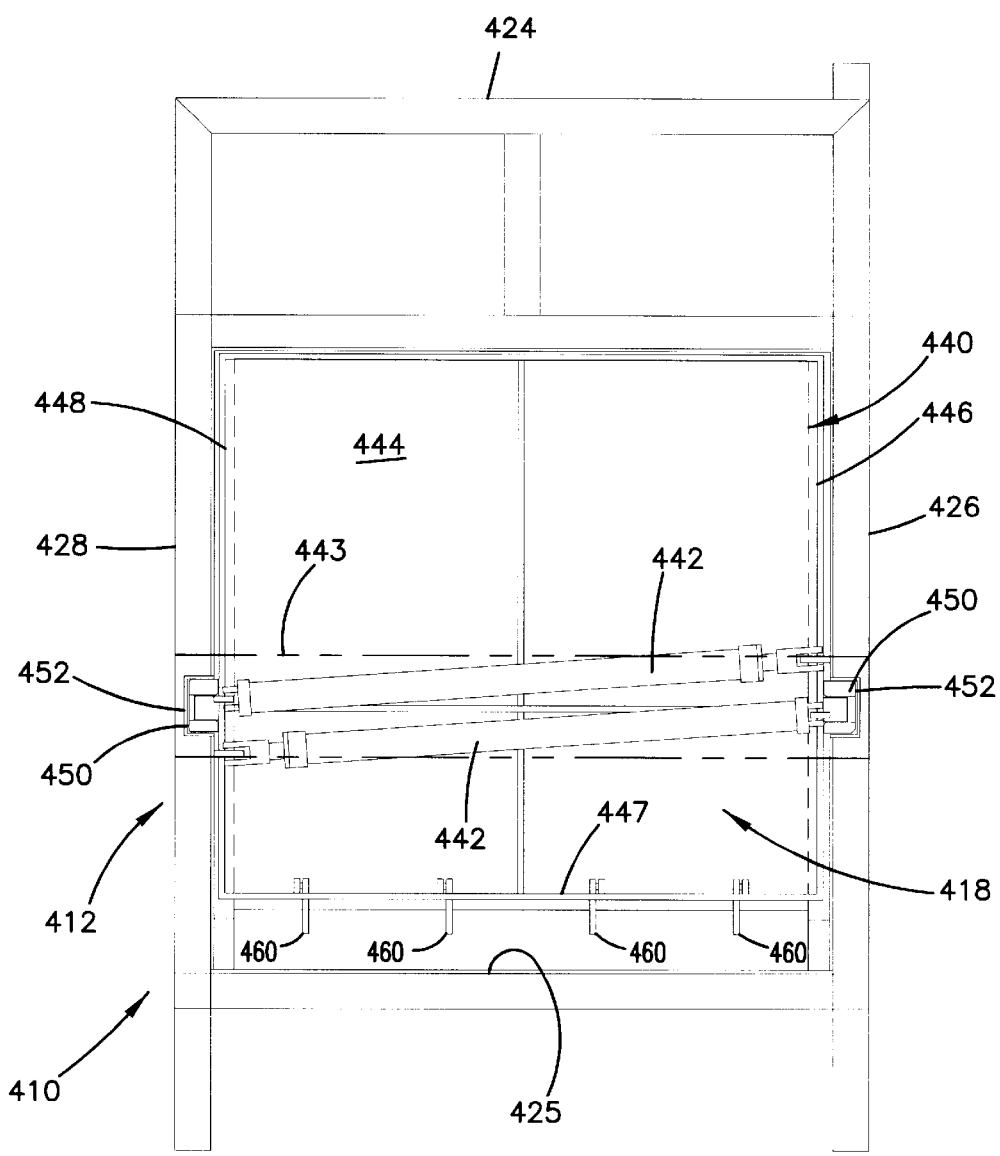
FIG. 9 is a back view of the palletized container processing apparatus of FIG. 7.
Figure 10A:
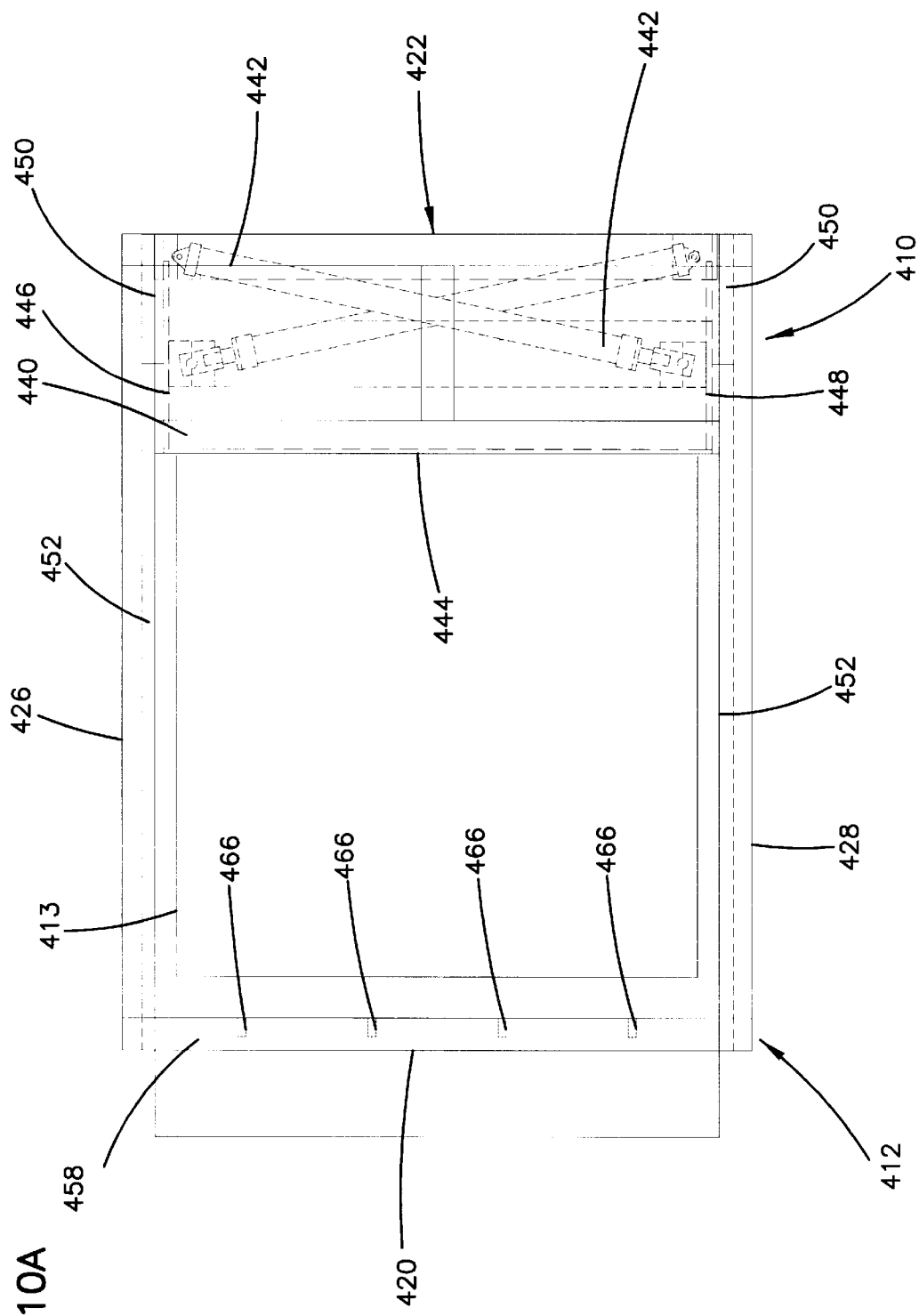
FIG. 10A is a top view of the palletized container processing apparatus of FIG. 7, the apparatus is shown in a first position in which the apparatus is adapted for receiving a palletized container.
Figure 10B:
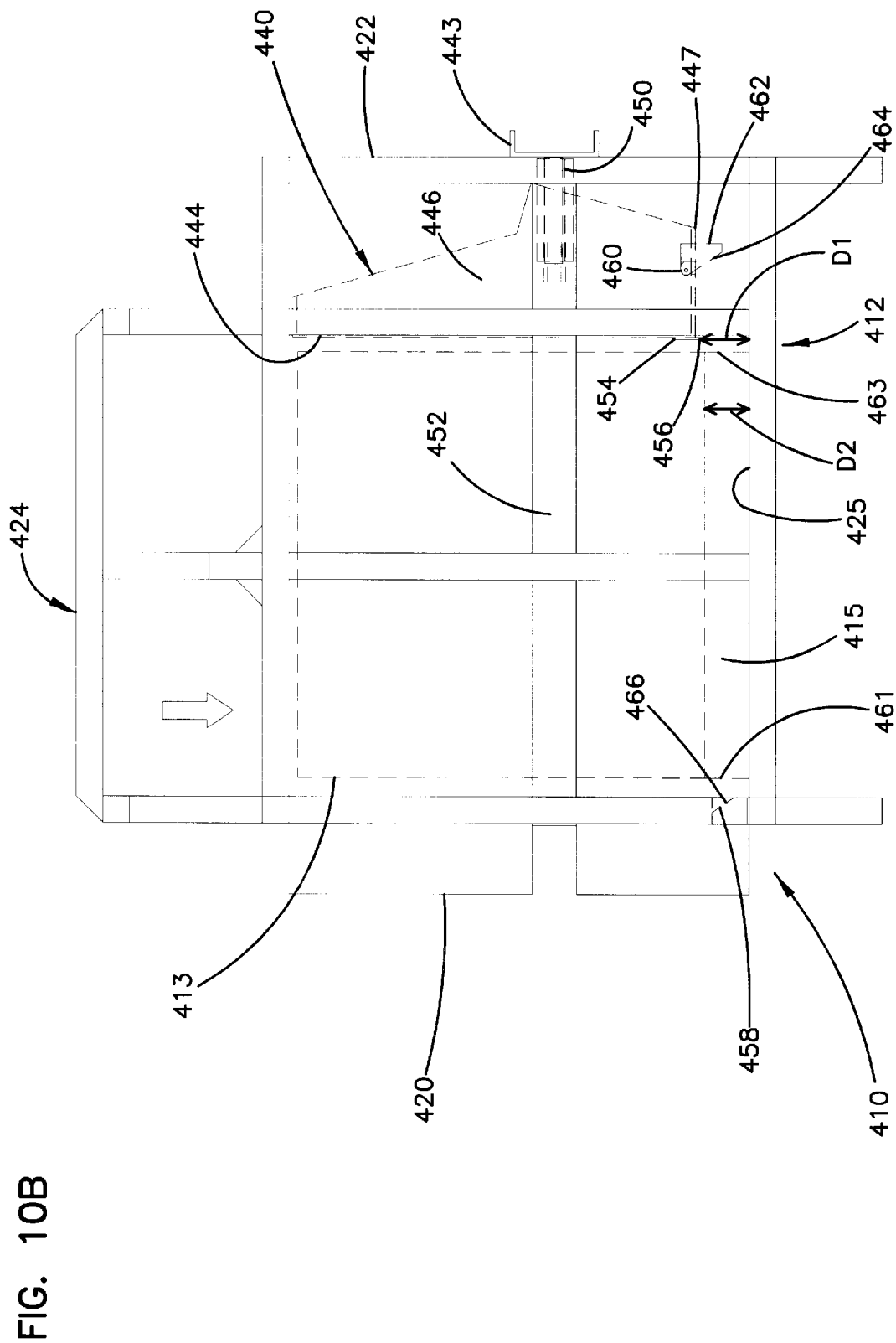
FIG. 10B is a side view of the palletized container processing apparatus of FIG. 7, the apparatus is shown in the first position in which the apparatus is adapted for receiving a palletized container.
Figure 11A:
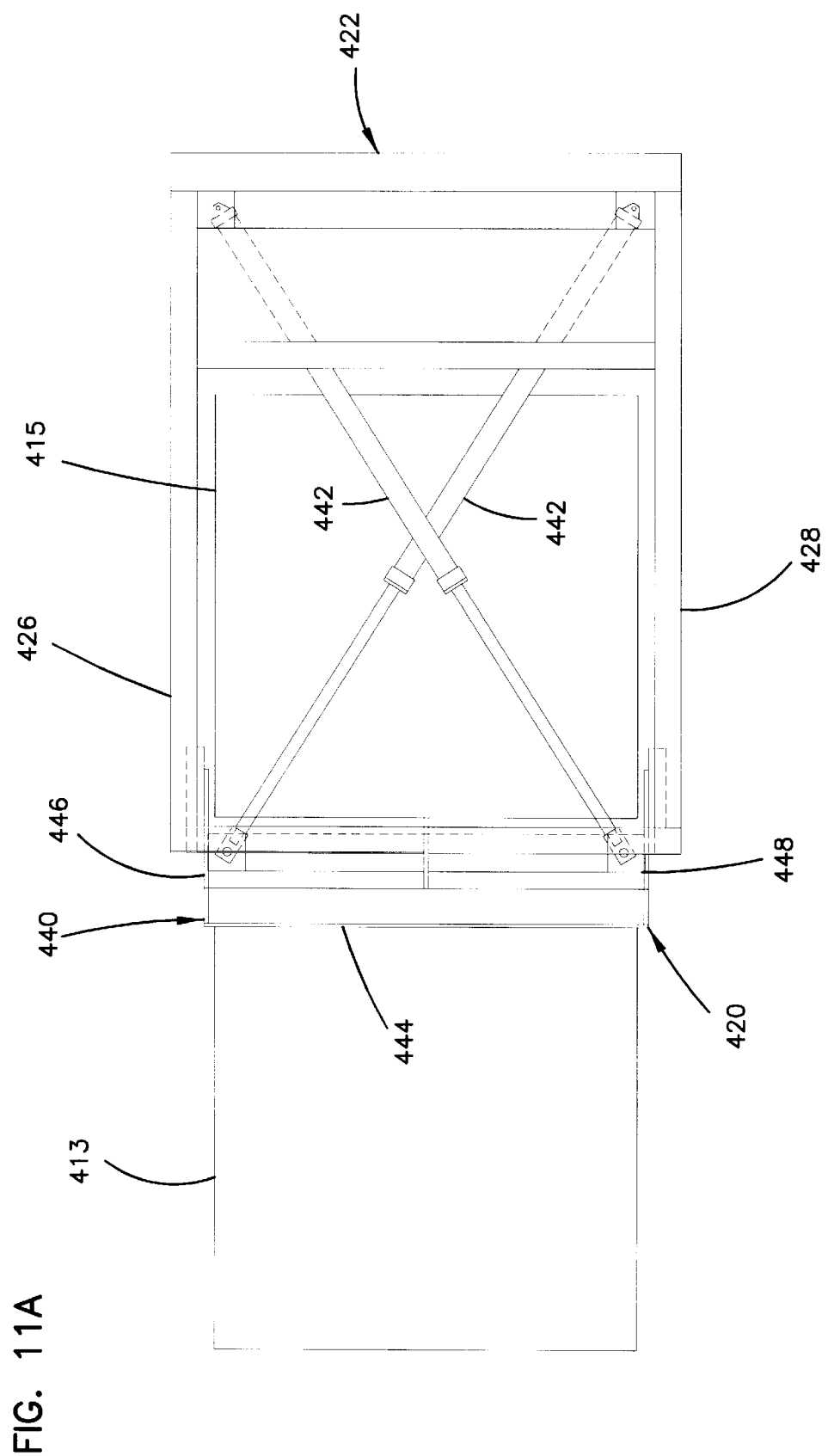
FIG. 11A is a top view of the palletized container processing apparatus of FIG. 7, the apparatus is shown in a second position in which the apparatus is adapted for discharging a container from the apparatus.
Figure 11B:
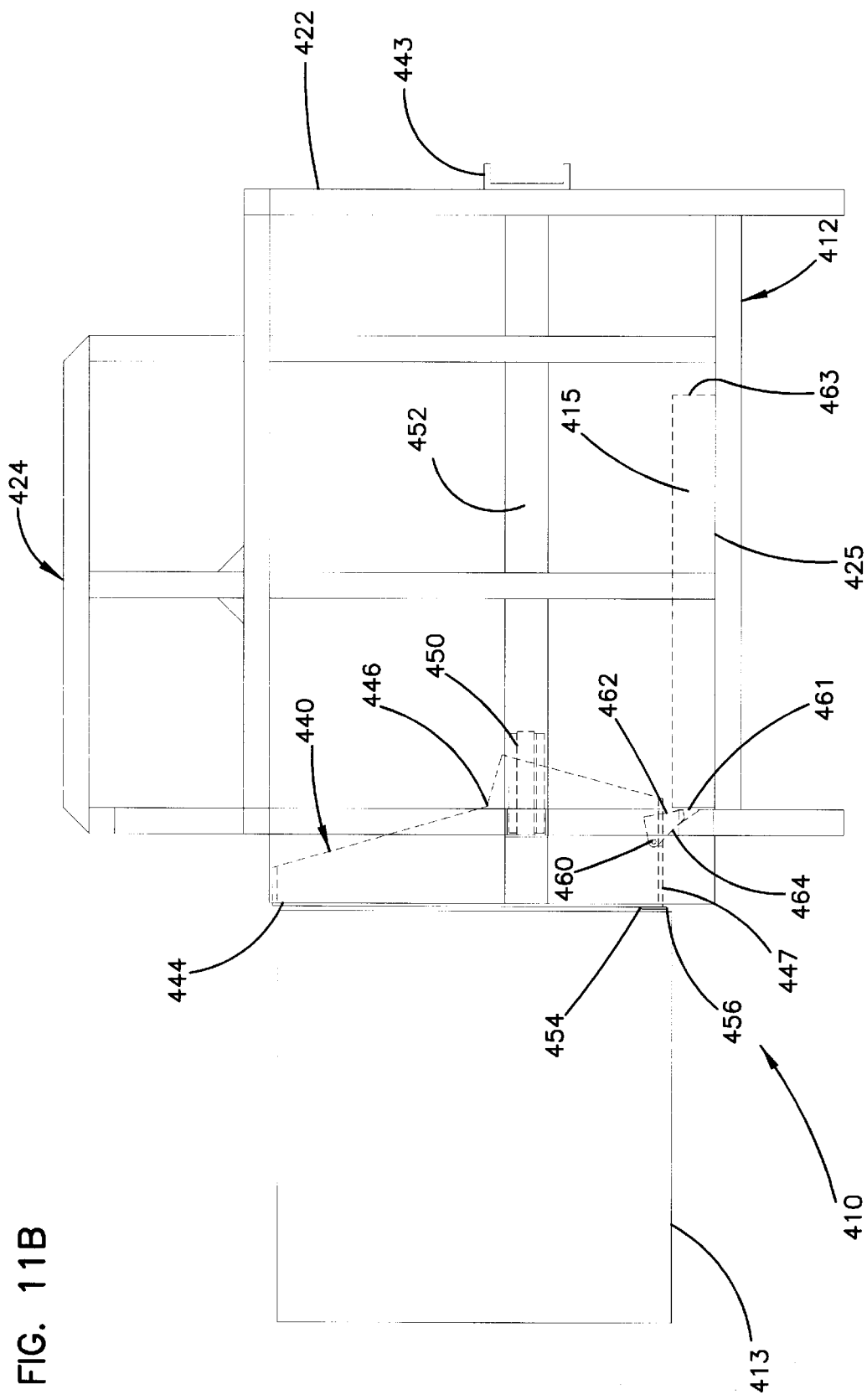
FIG. 11B is a side view of the palletized container processing apparatus of FIG. 7, the apparatus is shown in the second position in which the apparatus is adapted for discharging a container from the apparatus.
Figure 12:
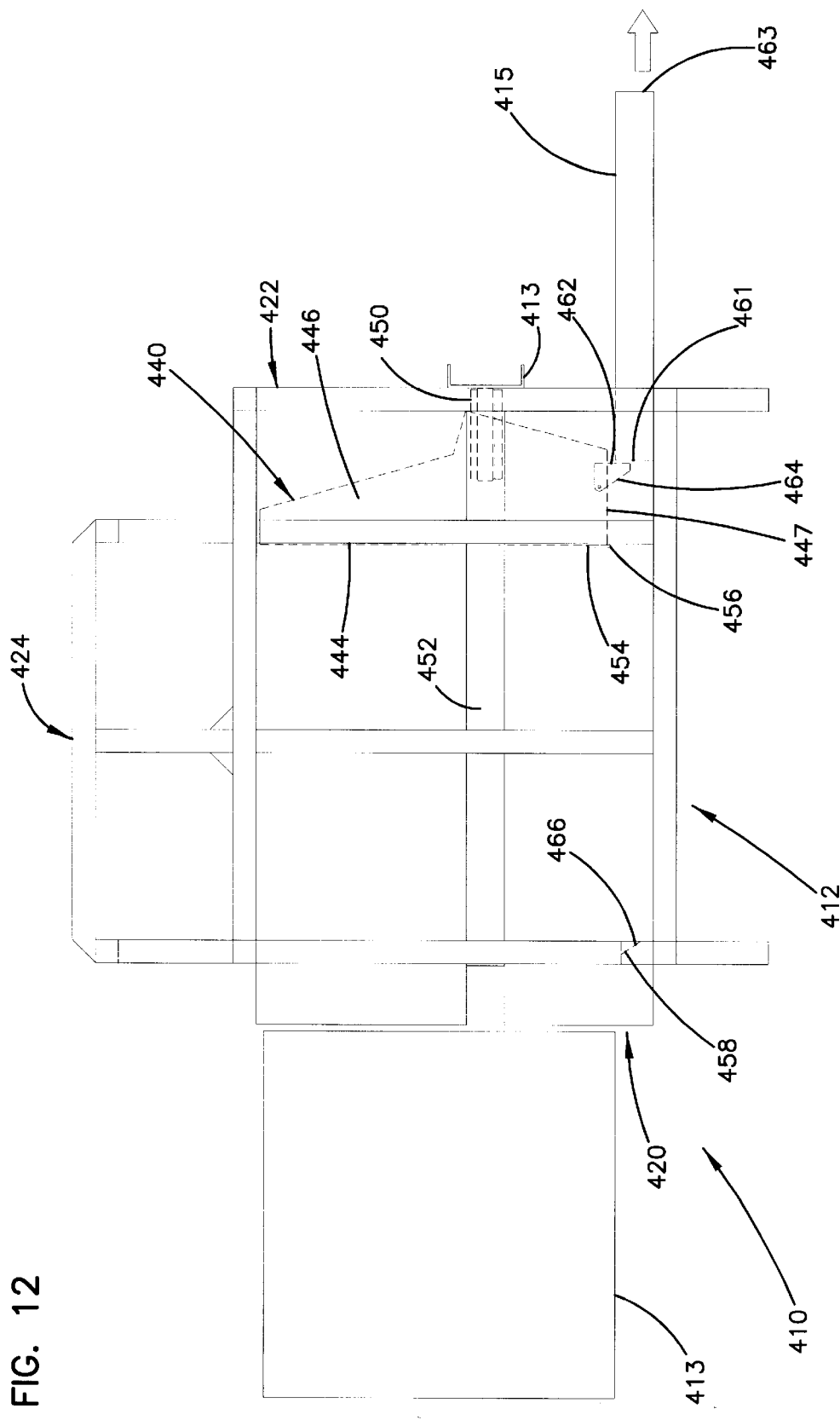
FIG. 12 is a side schematic view of the palletized container processing apparatus of FIG. 7 after the pallet and the container have been discharged from the apparatus.

FIGS. 9, 10A, and 11A illustrate a preferred drive mechanism including a pair of crossed two-way drive cylinders 442. Each of the drive cylinders 442 has one end fixedly connected to the back of the shearing member 440 and the other end fixedly connected to the receptacle 412 via a connecting member 443 that extends across the back opening 418 and is fastened to the sides 426 and 428 of the receptacle 412. The crossed configuration of the drive cylinders 442 minimizes the space occupied by the drive cylinders when the shearing member 440 is in the first position. The crossed configuration of the drive cylinders 442 also ensures that balanced forces are applied to the shearing member 440. It will be appreciated that one of the drive cylinders 442 is positioned above the other of the drive cylinders 442 to enable the cylinders 442 to cross one another without interference. It will also be appreciated that the drive cylinders are either conventional hydraulic or pneumatic two-way drive cylinders and are powered by a source of compressed fluid (not shown).

As shown in FIGS. 7, 10A, 10B, 11A, 11B and 12, the shearing member 440 of the shearing mechanism includes a rectangular platen 444 that is vertically mounted within the receptacle 412. End plates 446 and 448 are connected to opposite ends of the rectangular platen 444. The end plates 446 and 448 extend transversely rearward from the platen 444 and have outer surfaces that respectively face the first and second sides 426 and 428 of the receptacle 412. Substantially horizontal linear bearings 450 are mounted on the outer surfaces of the end plates 446 and 448. The linear bearings 450 are slidingly mounted within horizontal tracks 452 incorporated within the first and second sides 426 and 428 of the receptacle 412. The horizontal tracks 452 have open sides that face the interior of the receptacle 412 and have generally C-shaped cross sections. The horizontal tracks 452 extend generally from the front side 420 of the receptacle 412 to the back side 422 of the receptacle 412 and are configured to slidingly receive the linear bearings 450 of the shearing member 440 such that the shearing member 440 is movably mounted within the receptacle 412. The linear bearings 450 preferably include a layer of low friction material, such as Teflon, that engages the horizontal tracks 452 to facilitate movement of the shearing member 440.

The shearing member 440 also includes a substantially horizontal base member 447 connected to the bottom of the platen 444. The base member 447 interconnects the bottom ends of the substantially vertical end plates 446 and 448 and extends rearwardly from the platen 444. The shearing member 440 further preferably includes a blade member 454 connected to the bottom of the platen 444. The blade member 454 is preferably mounted on the front face of the platen 444 and preferably extends generally transversely between the first and second sides 426 and 428 of the receptacle 412. The blade member 454 preferably has a lower edge 456 that is positioned a predetermined distance $D_1$ above the bottom side 425 of the receptacle 412. As shown in FIG. 10B, the predetermined distance $D_1$ is preferably slightly larger than the thickness $D_2$ of the pallet 415. In this manner, when the pallet 415 of the palletized container 411 rests upon the bottom side 425 of the receptacle 412, the lower edge 456 of the blade member 454 aligns substantially with the interface between the container 413 and the pallet 415. By moving the shearing member 440 within the receptacle 412, the lower edge 456 of the blade member 454 is caused to pass closely over the top of the pallet 415 such that the container 413 is scraped or sheared from the pallet 415.

It will be appreciated that the blade member 454 is preferably vertically adjustable so that the distance $D_1$ between the lower edge 456 of the blade member 454 and the bottom side 425 of the receptacle 412 can be varied. For example, the blade member 454 can be connected to the platen 444 by bolts which pass through elongated holes in one of the blade member 454 and the platen 444. The holes are elongated in a vertical direction. By loosening the bolts, the spacing of the lower edge 456 can be vertically adjusted by vertically moving the blade 454 relative to the platen 444. Once the desired spacing is achieved, the bolts are re-tightened such that the blade member 454 is locked in place.

The shearing mechanism also includes a restraining structure constructed and arranged to engage the pallet 415 such that the pallet 415 resists any shearing forces that are applied to the container 413. For example, as shown in FIG. 7, the restraining structure comprises a steel restraining member 458 mounted at the bottom of the front opening 416 of the receptacle 412. The restraining member 458 projects upward from the bottom side 425 of the receptacle 412 and preferably extends horizontally between the first and second sides 426 and 428 of the receptacle 412. The restraining member 458 preferably has an elevation slightly less than the thickness of the pallet 415 to allow the shearing member 440 to pass over the restraining member 458 as the shearing member 440 moves to the second position.

In operation of the shearing mechanism, the blade member 454 is first vertically adjusted such that the lower edge 456 is spaced the predetermined distance $D_1$ from the bottom side 425 of the receptacle. Next, the palletized container 411 is oriented above a top opening 414 of the receptacle 412. Once the palletized container 411 is aligned above the top opening 414, the palletized container 414 is dropped through the chute structure 430 of the receptacle 412 and falls via gravity into the receptacle 412. Within the receptacle 412, the pallet 415 of the palletized container 411 rests upon the bottom side or bed 425 of the receptacle 412. Because the lower edge 456 is spaced the predetermined distance $D_1$ from the bottom side 425 of the receptacle 412, the lower edge 458 is aligned with the interface between the bottom side of the container 413 and the top side of the pallet 415.

Once the palletized container is positioned within the receptacle 412, the shearing member 440 is driven from the first position (shown in FIGS. 10A and 10B) toward the second position (shown in FIGS. 11A and 11B). As the shearing member 440 moves toward the second position, the platen 444 engages the container causing a first end 461 of the pallet 415 to abut against the restraining member 458. The restraining member 458 prevents the pallet 415 from moving as the shearing member 440 shears the container from the pallet 415. It will be appreciated that as the shearing member 440 moves from the first position toward the second position, the lower edge 456 of the blade member 454 passes in close proximity to the top of the pallet 415 such that substantially all of the container is sheared or scraped from the pallet 415. When the shearing member 440 reaches the second position, the container 413 has been completely sheared from the pallet 415 and has been discharged through the front opening 416 of the receptacle by the shearing member 440.

The palletized container processing apparatus 410 is also preferably equipped with a mechanism for discharging pallets from the receptacle 412. As shown in FIGS. 7, 9, 10B, 11B, and 12, the pallet discharge mechanism includes a plurality of triangular pivot members 460 that are pivotally connected to the base member 447 of the shearing member 440. The pivot members 460 each include a pushing surface 462 that generally faces the back side 422 of the receptacle 412 and a ramp surface 464 that generally faces the front side 418 of the receptacle 412. The pushing surfaces 462 and the ramp surfaces 464 preferable form acute angles with respect to each other. Slots are cut in the base member 447 for allowing the triangular pivot members 460 to pivot via gravity from a raised position toward a lowered position without encountering interference from the base member 447.

When the pivot members 460 are in the lowered position, the ramp surface 464 engages the base member 447 to prevent the pivot members 460 from further pivoting. Also, when the pivot members 460 are in the lowered position, portions of the pivot members 460 are spaced less than the predetermined distance $D_1$ from the bottom side 425 of the receptacle 412 such that the pivot members 460 are configured to engage a pallet supported on the bottom 425 of the receptacle 412. By contrast, when the pivot members 460 are pivoted in the raised position, the pivot members 460 are spaced at least the predetermined distance $D_1$ from the bottom side 425 of the receptacle 412 such that the pivot members 460 are adapted to pass over the top of any pallets that may be supported by the bottom side 425 of the container.

When the palletized container 411 is placed within the receptacle 412 and the shearing member 440 is moved from the first position toward the second position, the ramp surfaces 464 of the pivot members 460 engage a second end 463 of the pallet 415 causing the pivot members 460 to pivot to the raised position. In the raised position, the pivot members 460 do not interfere with the pallet 415 as the shearing member 440 moves toward the front opening 416 of the receptacle 412. As soon as the pivot members 460 move past the first end 461 of the pallet 415, gravity causes the pivot members 460 to pivot downward to the lowered position. It will be appreciated that slots 466 are cut into the restraining member 458 to provide clearance for allowing the pivot members 460 to pivot downward. With the pivot members 460 in the lowered position, the pushing surfaces 462 of the pivot members 460 face the first end 461 of the pallet 415. When the shearing member 440 is driven from the second position back to the first position, the pushing surfaces 464 of the pivot members 460 engage the first end 461 of the pallet 415 forcing the pallet 415 along the bottom side 424 of the receptacle 412 toward and through the back opening 418 of the receptacle 412. It will be appreciated that the pallet is not discharged completely through the back opening 418 of the receptacle 412. Instead, the pallet is discharged far enough through the back opening 418 to provide sufficient clearance for dropping the next palletized container into the receptacle 412. The pallet 415 will be forced completely through the back opening 418 when a subsequent pallet is pushed through the back opening 418 by the pivot members 460.

Figure 13:
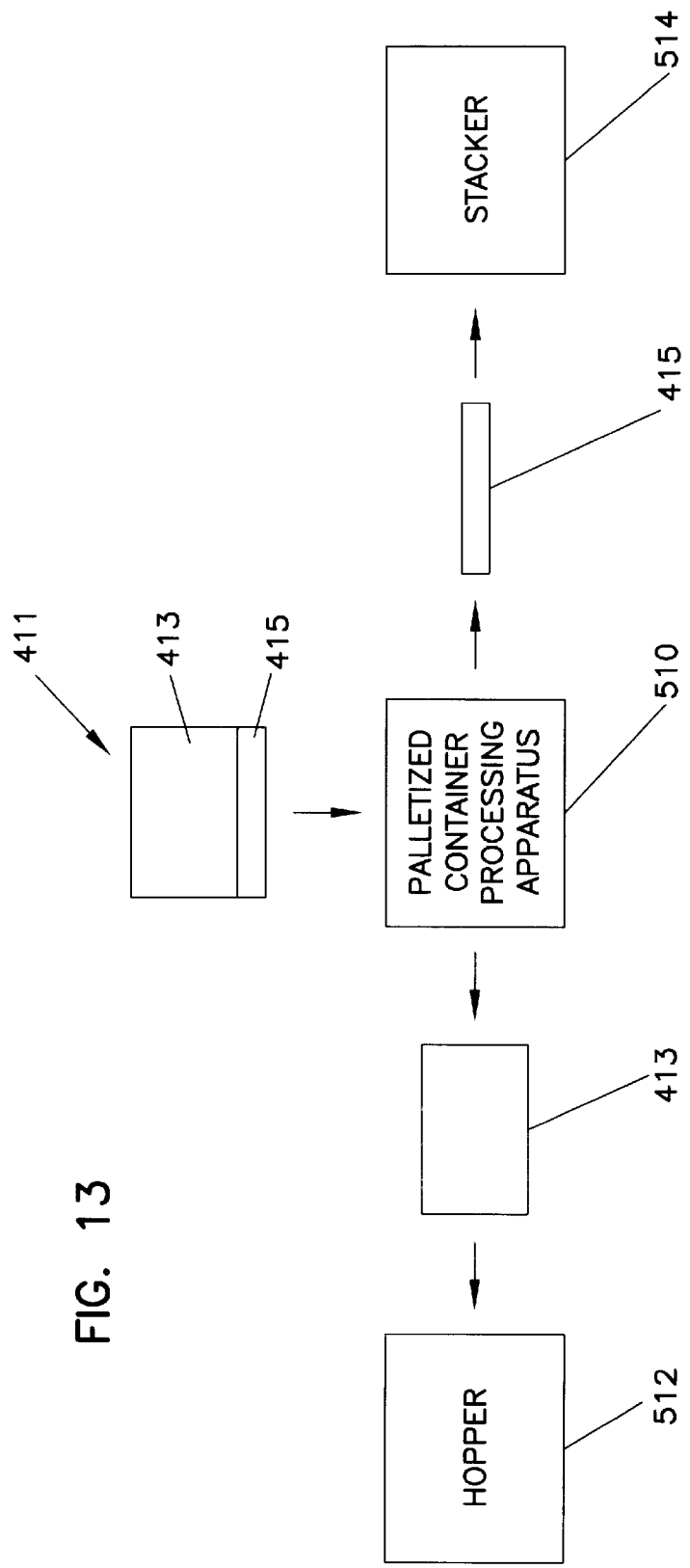
FIG. 13 is a block diagram illustrating a palletized container processing system constructed in accordance with the principles of the present invention.

It will be appreciated that any of the embodied palletized container processing apparatuses described above can be incorporated within a palletized container processing system. FIG. 13 shows an exemplary system. The system includes a palletized container processing apparatus 510 including a shearing mechanism for shearing a container 413 from a pallet 415 and discharging the container 413 through a container discharge opening and the pallet 415 through a separate discharge opening. The apparatus 510 could preferably comprises the apparatus 410 illustrated in FIGS. 7–12.

The sheared containers 413 that are discharged through the container discharge opening of the apparatus 510 are received by a wheeled gondola or hopper 512. The hopper 512 is detachable connected to the apparatus 510 and defines an opening in alignment with the container discharge opening of the apparatus 510. The shearing mechanism of the apparatus 510 preferably pushes the sheared containers 413 through the container discharge opening and into the hopper 512. It will be appreciated that as the hopper 512 becomes filled with sheared containers 413, the sheared containers 413 are compressed/compacted within the hopper 512 by the shearing mechanism of the apparatus 510.

The pallets 415 that are discharged through the pallet discharge opening of the apparatus 510 are received by a conventional pallet stacker 514. The pallet stacker stacks the pallets 415 in a pile to facilitate transporting the pallets via a forklift. It will also be appreciated that an exemplary stacker for use in association with the aforementioned system is sold by Industrial Resources Company of Marne Mich.

It will be appreciated that the term container is intended to include any structure that can be affixed to a pallet to support or contain a product. Exemplary containers include cardboard boxes or portions of cardboard boxes that are affixed to pallets by conventional means such as nails, staples, clips, or adhesives.

With regard to the foregoing description, it is to be understood that changes may be made in detail, especially in matters of the construction materials employed and the shape, size, and arrangement of the parts without departing from the scope of the present invention. It is intended that the specification and depicted embodiment be considered exemplary only, with a true scope and spirit of the invention being indicated by the broad meaning of the following claims.

What is claimed is as follows:

1. An apparatus for processing a palletized container, the palletized container including a container affixed to a pallet, the apparatus comprising:
   a receptacle sized for receiving the palletized container, the receptacle including a bed for supporting the palletized container within the receptacle;
   a shearing platen disposed within the receptacle at a location above the bed of the receptacle, the shearing platen being oriented in an upright position with respect to the bed, and the shearing platen having a lower edge spaced a predetermined distance above the bed, the predetermined distance being greater than a thickness of the pallet; and
   means for generating relative movement between the shearing platen and bed in a direction generally parallel to a top surface of the bed, wherein when the palletized container is placed within the receptacle and relative movement is generated between the bed and the shearing platen, the container is sheared from the pallet by the shearing platen.

2. The apparatus of claim 1, wherein the bed is stationary and the shearing platen is reciprocated along the bed by a drive assembly.

3. The apparatus of claim 1, further comprising an elongated blade fixedly connected to the shearing platen adjacent the lower edge of the shearing platen.

4. The apparatus of claim 1, wherein the bed is formed by a pivot plate pivotally mounted within the receptacle, the pivot plate being pivotally moveable between a generally horizontal position in which the pivot plate is adapted to support the pallet, and a generally vertical position in which the pivot plate is adapted to discharge the pallet from the receptacle.

5. The apparatus of claim 1, wherein the bed is formed by a slide plate moveable mounted within the receptacle, and wherein the apparatus further includes a drive mechanism for reciprocating the slide plate relative to the shearing platen.

6. An apparatus for separating a container from a pallet, the apparatus comprising:
   a receptacle sized for receiving the pallet with the container affixed thereto, the receptacle including a bed for supporting the pallet within the receptacle;
   a shearing platen disposed within the receptacle, the shearing platen being transversely oriented with respect to the bed of the receptacle, the shearing platen including and elongated blade having an edge spaced a predetermined distance from the bed, the predetermined distance being larger than a thickness of the pallet; and
   a drive mechanism for reciprocally driving the shearing platen along the bed between first and second positions, wherein when the container and pallet are positioned in the receptacle and the shearing platen is driven between the first and second positions, the container is sheared form the pallet by the shearing platen.

7. The apparatus of claim 6, further comprising a lip structure extending from the bed toward the shearing platen for engaging the pallet to resist movement of the pallet as the container is sheared from the pallet.

8. The apparatus of claim 6, wherein the bed is stationary.

9. The apparatus of claim 6, wherein the bed is formed by a pivot plate pivotally mounted within the receptacle, the pivot plate being pivotally moveable between a generally horizontal position in which the pivot plate is adapted to support the pallet, and a generally vertical position in which the pivot plate is adapted to discharge the pallet from the receptacle.

10. The apparatus of claim 6, wherein the drive mechanism comprises a motor driven cable assembly.

11. The apparatus of claim 6, wherein the drive mechanism comprises a pair of drive cylinders.

12. The apparatus of claim 11, wherein the cylinders are crossed.

13. The apparatus of claim 6, further comprising a pivot member pivotally connected to the shearing platen adjacent the blade, the pivot member being pivotally moveable between a first orientation in which a portion of the pivot member is spaced at least the predetermined distance from the bed, and a second orientation in which the portion of the pivot member is spaced less than the predetermined distance from the bed such that the pivot member is adapted to engage the pallet, wherein the pivot member and the shearing platen cooperate to discharge the pallet from receptacle.

14. The apparatus of claim 6, wherein the spacing between the blade of the shearing platen and the bed is adjustable.

15. An apparatus for processing a palletized container, the palletized container including a container affixed to a pallet, the apparatus comprising:

a receptacle defining a entrance opening for introducing the palletized container into the receptacle, a pallet discharge opening for discharging the pallet from the receptacle, and a container discharge opening for discharging the container from the receptacle, the receptacle also including a bed for supporting the palletized container within the receptacle by engaging the pallet of the palletized container;

a shearing member moveably mounted within the receptacle, the shearing member having a lower edge spaced a predetermined distance above the bed of the receptacle, the predetermined distance being slightly greater than a height of the pallet;

a restraining structure for preventing the pallet from moving toward the container discharge opening; and a drive mechanism for reciprocally driving the shearing member between a first position adjacent to the pallet discharge opening and a second position adjacent to the container discharge opening, wherein when the drive mechanism drives the shearing member from the first position to the second position, the shearing member is adapted for shearing the container from the pallet and discharging the container through the container discharge opening.

16. The apparatus of claim 15, wherein the restraining structure comprises a restraining member projecting upward from the bed of the receptacle at a location adjacent to the container discharge opening.

17. The apparatus of claim 15, further comprising a pallet discharge structure constructed and arranged for discharging the pallet through the pallet discharge opening.

18. The apparatus of claim 17, wherein the pallet discharge structure comprises a pivot member pivotally connected to the shearing member adjacent to the lower edge, the shearing member and the pivot member cooperating to force the pallet through the pallet discharge opening as the shearing member moves from the second position to the first position.

19. A system for processing palletized containers, each palletized container including a container affixed to a pallet, the system comprising:

a receptacle arranged and configured for receiving the palletized containers, the receptacle including a container discharge opening and a separate pallet discharge opening;

a shearing mechanism incorporated within the receptacle, the shearing mechanism being constructed and arranged for generating relative movement between the containers and the pallets such that the containers are sheared from the pallets and discharged through the container discharge opening;

a pallet discharge mechanism for discharging the pallets from the receptacle through pallet discharge opening;

a pallet stacking mechanism for receiving the pallets from the pallet discharge opening, the pallet stacking mechanism being constructed and arranged to stack the pallets; and a hopper for receiving the containers from the container discharge opening of the receptacle, wherein the containers are compacted within the hopper by the shearing mechanism.

20. A method for processing a palletized container, the palletized container including a container affixed to a pallet, the method comprising:

placing the palletized container in a receptacle having a pallet discharge opening and a container discharge opening, the receptacle including a shearing member mounted therein;

aligning an edge of the shearing member with an interface between the pallet and the container;

generating relative movement between the pallet and the container such that the shearing member engages the container and shears the container from the pallet;

discharging the sheared container through the container discharge opening; and discharging the pallet through the pallet discharge opening.

* * * * *